US008571378B2

United States Patent
Morimoto

(10) Patent No.: US 8,571,378 B2
(45) Date of Patent: Oct. 29, 2013

(54) IMAGE CAPTURING APPARATUS AND RECORDING METHOD

(75) Inventor: Naoki Morimoto, Tokyo (JP)

(73) Assignee: Sony Corporation, Tokyo (JP)

(*) Notice: Subject to any disclaimer, the term of this patent is extended or adjusted under 35 U.S.C. 154(b) by 1000 days.

(21) Appl. No.: 12/066,762

(22) PCT Filed: Jul. 19, 2006

(86) PCT No.: PCT/JP2006/314243
§ 371 (c)(1),
(2), (4) Date: Mar. 13, 2008

(87) PCT Pub. No.: WO2007/032145
PCT Pub. Date: Mar. 22, 2007

(65) Prior Publication Data
US 2009/0136210 A1 May 28, 2009

(30) Foreign Application Priority Data
Sep. 13, 2005 (JP) ................. P2005-264638

(51) Int. Cl.
*H04N 9/80* (2006.01)
(52) U.S. Cl.
USPC ........... 386/117; 386/239; 386/240; 386/241; 386/242; 386/247
(58) Field of Classification Search
USPC .................. 386/117, 239–242, 247
See application file for complete search history.

(56) References Cited

U.S. PATENT DOCUMENTS

| 5,262,867 | A  | * | 11/1993 | Kojima ............................ 348/39 |
| 6,625,383 | B1 | * | 9/2003 | Wakimoto et al. ............ 386/224 |
| 6,833,865 | B1 |   | 12/2004 | Fuller et al. |
| 2004/0086265 | A1 |   | 5/2004 | Tojo et al. |
| 2005/0232606 | A1 | * | 10/2005 | Hosoda et al. ................ 386/111 |
| 2006/0066744 | A1 | * | 3/2006 | Stavely et al. ................ 348/352 |
| 2007/0204319 | A1 | * | 8/2007 | Ahmad et al. ................ 725/134 |

FOREIGN PATENT DOCUMENTS

| JP | 05-191699 | 7/1993 |
| JP | 06-165009 | 6/1994 |
| JP | 07-236115 | 9/1995 |
| JP | 10-224735 | 8/1998 |
| JP | 2001-326901 | 11/2001 |

(Continued)

OTHER PUBLICATIONS

"Coefficient," Webster's Third International Dictionary, Merriam-Webster Inc., 1993, 1 page.*

(Continued)

*Primary Examiner* — Carl Colin
*Assistant Examiner* — John Elmore
(74) *Attorney, Agent, or Firm* — Sherr & Jiang, PLLC

(57) ABSTRACT

When setting of marking on recording data is performed, the marking is automatically performed at a suitable position corresponding to a status during image capturing. While recording of captured images is being performed, a status of a zoom operation, a moving pattern of a camera, and a feature value of video/audio signals are monitored, and a time point at which a predetermined change has occurred regarding this monitored state is detected. A predetermined data position based on this detected time point is then set as a marking position. Setting information of the marking position is stored in a structure of management information, and is stored in a storage section together with the recording data.

24 Claims, 16 Drawing Sheets

(56) References Cited

FOREIGN PATENT DOCUMENTS

| | | |
|---|---|---|
| JP | 2003-299010 | 10/2003 |
| JP | 2004-072728 | 3/2004 |
| JP | 2004-236238 | 8/2004 |

OTHER PUBLICATIONS

Supplementary European Search Report issued Jul. 29, 2011, in Munich in EP 06 78 1250.

* cited by examiner

IMAGE CAPTURING APPARATUS AND RECORDING METHOD

TECHNICAL FIELD

The present invention relates to image capturing apparatuses capable of recording captured images as moving image information and to recording methods for such image capturing apparatus.

BACKGROUND ART

Efficiently managing moving image information recorded on recording media is desired for image capturing apparatuses, such as video cameras, capable of recording captured images on the recording media as the moving image information. Accordingly, for one thing, it has been carried out that particular meaningful positions on data of the moving image information recorded on the recording media is set as sectioning positions or dividing points. Since setting of such sectioning positions can be considered to be the same as attaching marks at the data positions on the moving image information, the setting of the sectioning positions is referred to as marking hereinafter and the sectioning positions are referred to as marking positions.

The marking positions set in such a manner can be utilized in a search at the time of playback of the moving image information. That is, it is possible to access and start playing the moving image information recorded on, for example, a recording medium using a given marking position as a start point.

Meanwhile, conventional image capturing apparatuses are generally configured to perform marking at a data position corresponding to a start timing of recording (image recording) of captured images on a recording media (Japanese Unexamined Patent Application Publication No. 2004-72728).

However, in the configuration of setting only a data position corresponding to the start of recording as the marking position in the above-described manner, marking positions are not set between a start and an end of the recording. For this reason, even in a circumstance where the marking is desired during the recording, the marking cannot be performed for this circumstance. For example, when the duration of a single recording session becomes long, the recorded content is not monotonous but some changes are highly likely to occur therein. If the marking is not performed in response to such changes during the recording, a playback function becomes poor.

Accordingly, for example, a configuration for allowing marking positions to be set manually, for example, through key operations during image capturing is also possible. However, when it is taken into consideration that a cameraperson sets marking positions during image capturing, an inconvenience that the cameraperson cannot concentrate on the image capturing may be caused. In this case, as the duration of one recording session becomes longer, determination of setting of marking positions becomes more difficult for the cameraperson.

Additionally, in recent years, it has been possible to perform edition of moving image information recorded on recording media using image capturing apparatuses and personal computers. The utilization of such edition allows edition to set marking positions at mid-course positions on moving image information recorded during one recording session to be performed. However, such a post-recording edition imposes a troublesome work, which is to perform marking while confirming the content of the moving image information, on users.

Accordingly, the present invention intends to allow marking to be performed while one recording session is underway and to allow, by further advancing this, setting of marking positions to be performed as efficiently as possible. To this end, the present invention allows marking to be automatically performed at appropriate positions according to a status during image capturing without depending on, for example, operations or the like for positively setting marking positions according to users' intentions.

DISCLOSURE OF INVENTION

Accordingly, the present invention is configured as an image capturing apparatus in the following manner in view of the above-described problems.

More specifically, an image capturing apparatus is configured to include captured image acquiring means for acquiring image information through image capturing, recording means for recording, as recording information, at least the image information acquired by the captured image acquiring means as moving image information, apparatus state detecting means for detecting that the image capturing apparatus is in a predetermined state while image capturing for acquiring the moving image information to be recorded by the recording means is being performed, and sectioning position setting means for setting a sectioning position on the moving image information on the basis of timing at which the apparatus state detecting means has detected the predetermined state.

In the above-described configuration, a predetermined state regarding an image capturing apparatus is detected while image capturing for acquiring moving image information to be recorded on, for example, a recording medium (a storage medium) is being performed. In response of the detection of this predetermined state, a sectioning position (a marking position) on the moving image information is set (marked). This means that marking is appropriately performed according to a predetermined state of an image capturing apparatus between a start (a start of image recording) and an end of an operation for recording the captured images on the recording medium as the moving image information.

On that basis, in this embodiment, a sectioning position is set on the basis of a timing at which the apparatus state detecting means has detected a predetermined state of the image capturing apparatus. The present invention assumes that a time when a specific state of the image capturing apparatus occurs often matches a time when an operation is performed on the image capturing apparatus according to an editorial intention of a cameraperson performing the image capturing or a time when a change has occurred in the content of the captured images. On the basis of this, a result that the sectioning position is set at an appropriate position with reference to the content of the moving image information, such as a sectioning position automatically set on moving image information by a configuration of the present invention corresponds to a time when some sort of change occurs in a stream of image contents of the moving image information, can be yielded.

In this manner, the present invention can sets sectioning positions at appropriate positions according to the content of images in the course of moving image information to be recorded between a start and an end of recording. This allows setting (marking) of the sectioning positions on the moving image information to be performed efficiently, and leads to an improvement of a user's convenience.

BEST MODE FOR CARRYING OUT THE INVENTION

Figure 1:
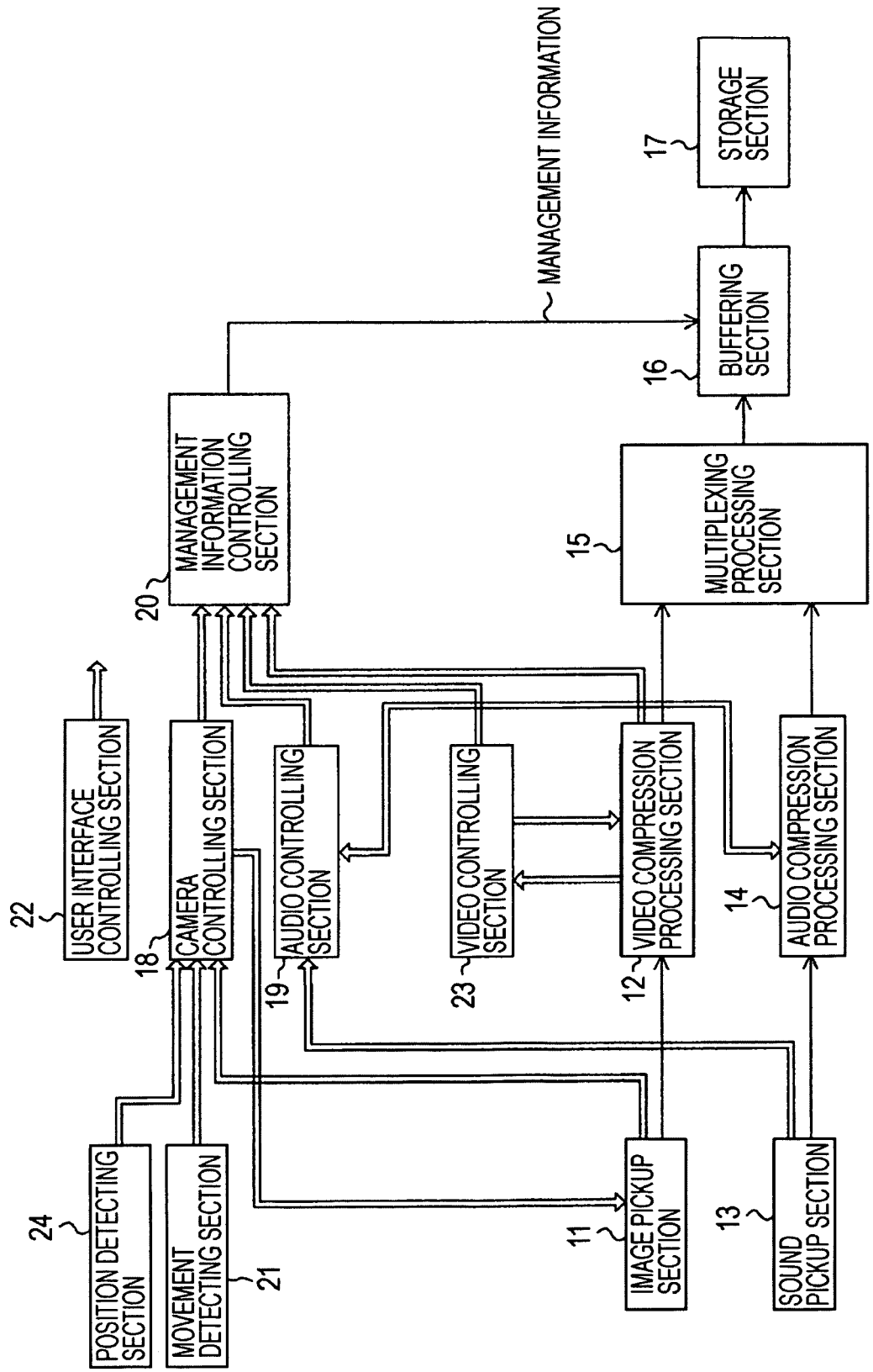
FIG. 1 is a diagram showing an example of a configuration of an image capturing apparatus supporting recording as an embodiment of the present invention.

FIG. 1 selectively shows a configuration supporting recording of captured images as an image capturing apparatus that is the best mode for carrying out the invention (an embodiment). In this drawing, solid arrows indicate a flow of information, such as video signals, audio signals, or management information, that serves as user data to be written and stored on a recording medium (a storage medium) in a storage section. Empty arrows indicate a flow of information for various kinds of control.

An image pickup section 11 is constituted by, for example, an optical system (an optical system for use in image capturing), an image pickup device, an image signal processor before compression and encoding, and so forth. The optical system is constituted by a lens unit composed of lenses for image capturing, a lens stop, and so forth. The lens unit includes a focus lens for adjusting the focus and a zoom lens for adjusting the zoom (an angle of view). The image pickup section 11 includes a focus lens driving mechanism constituted by a gear and a motor for moving the focus lens along an optical axis direction in order to adjust the focus. In addition, the image pickup section 11 includes a zoom lens driving mechanism constituted by a gear and a motor for moving the zoom lens along the optical axis direction in order to adjust the zoom.

In the image pickup section 11, the captured light obtained by the optical system is imaged on a photoelectric converter unit included in the image pickup device and is converted into electric signals. A CCD (Charged Coupled Device) and a CMOS can be cited as the photoelectric converter.

The image pickup section 11 converts the electric signals output from the image pickup device into digital signal after performing, for example, CDS (Correlated Double Sampling) processing, AGC (Automatic Gain Control) processing, and so forth on the electric signals. The image pickup section 11 performs predetermined image signal processing according to digital signal processing on the digital signal. As this image signal processing, necessary digital signal processing including, for example, acquisition of digital video signals corresponding to the captured images from the digital signals, is executed.

Additionally, as the signal processing, the image pickup section 11 executes necessary signal processing for generation of necessary control parameters utilized by a camera controlling section 18 for camera control. Here, AF (Auto Focus) control, exposure control, white balance processing, motion blurring correction, and so forth can be cited as the camera control to be executed by the camera controlling section 18.

For example, in the case of the AF control, the image pickup section 11 executes the following signal processing. The AF control is to control the camera so that a focused state is automatically obtained not through a manual operation of a focus lens. To achieve the AF control, the image pickup section 11 is configured to acquire information of a distance to a subject to be focused (herein, referred to a subject distance) or subject distance information that is information equivalent to this distance. For example, if a ranging method for actually measuring a distance to a subject is adopted as the AF control method, information of the subject distance can be directly obtained. Additionally, in the case of a so-called contrast method that is based on detection of contrast of captured video signals, an evaluation value corresponding to the contrast is obtained as information equivalent to the subject distance information. The image pickup section 11 then outputs such subject distance information to the camera controlling section 18. The camera controlling section 18 converts the subject distance information to an amount of the movement of the focus lens, and controls the focus lens driving mechanism of the image pickup section 11 to perform control of moving the focus lens. By means of such control, a state in which the subject is focused on can be obtained.

In addition, a movement detecting section 21 is included for the motion blurring correction in this embodiment. The movement detecting section 21 of this case includes, for example, a gyro sensor. By fixing the movement detecting section 21 having such a configuration to the image capturing apparatus, it is possible to detect the direction of movement and an amount of the movement (a distance of the movement) of the image capturing apparatus itself. Thus, in a state where a user carries an image capturing apparatus and performs image capturing, a movement state of the image capturing apparatus due to the motion blurring at that time is detected as information of the above-described movement direction and movement amount.

The camera controlling section 18 receives detection information of, for example, the above-described movement detecting section 21 and performs predetermined processing, thereby obtaining information of an amount of movement of the image capturing apparatus as each component in the horizontal direction/the vertical direction. On the basis of this information, the camera controlling section 18 executes processing of the digital video signals obtained based on the captured images so that the movement in the horizontal/vertical directions of the captured images due to the motion blurring is canceled.

Meanwhile, regarding the motion blurring correction, a configuration for detecting movement of an image resulting from the motion blurring by analyzing a video signal of a captured image and for realizing the correction by video signal processing such as shifting of pixels in the horizontal/vertical directions so that this movement of the image is cancelled is also known. When the image capturing apparatus of this embodiment adopts such a configuration for motion blurring correction, a function as the movement detecting section 21 corresponds to, for example, processing for detecting movement of an image for the motion blurring correction of the image pickup section 11.

Additionally, a position detecting section 24 is provided in the image capturing apparatus of this embodiment.

The position detecting section 24 is constituted by a device, such as, for example, a GPS (Global Positioning System), and detects the present position based on information of the latitude and the longitude, for example. In the case of this embodiment, the present position information detected by the position detecting section 24 is input to the camera controlling section 18. The present position information acquired in this manner may be utilized in any way including, for example, using the present position information as additional information of recording data. However, in this embodiment, the present position information can be used in marking (automatic setting of sectioning positions on recording data) in a manner described later.

In addition, the position detecting section 24 may adopt a configuration capable of acquiring present position information other than that including a GPS.

The digital video signal finally obtained in the image pickup section 11 is input to a video compression processing section 12. The video compression section 12 performs compression and encoding on the input video signal according to a predetermined method. For example, under the present conditions, a compression encoding method for moving image information such as MPEG4 can be adopted.

The video signal compressed and encoded by the video compression processing section 12 is output to a multiplexing processing section 15.

In addition, a sound pickup section 13 is configured to include a predetermined number of microphones and audio signal processor for performing predetermined signal processing, before compression encoding, on audio signals obtained by capturing sound by the microphones. In this case, the audio signals are converted from analog to a digital format in the sound pickup section 13 at a predetermined signal processing stage.

The digital audio signal output from the sound pickup section 13 is output to an audio compression processing section 14.

The audio compression processing section 14 executes audio compression and encoding processing according to the image compression encoding method of the video compression processing section 12, and outputs the audio signal to the multiplexing processing section 15. Here, the video compression processing section 12 and the audio compression processing section 14 execute compression and encoding processing so that so-called lip-sync is maintained, and output the compressed and encoded video signal (compressed video data) and audio signal (compressed audio data), respectively.

The multiplexing processing section 15 receives the compressed video data and the compressed audio data output from the video compression processing section 12 and the audio compression processing section 14, and performs multiplexing of the received compressed video data and compressed audio data according to a data format compatible with a recording format of a storage section 17. The multiplexing processing section 15 transfers this multiplexed compressed video data and compressed audio data (compressed video/audio data) to a buttering section 16 to temporary buffer the data therein.

The camera controlling section 18 is a part collectively demonstrating predetermined control functions, which are represented by the AF control, the zoom control, and the motion blurring correction described before, for parts constituting a camera unit in the image pickup section 11. In addition, information, such as predetermined control results obtained in this camera controlling section 18, is received by a control section, an example of which is management information controlling section 20, and is used in generation of management information.

A video controlling section 23 performs various kinds of control so that the signal processing operations are appropriately executed in the video compression processing section 12. For example, the video controlling section 23 receives data from the video compression processing section 12, and executes various kinds of detection processing, such as detection of movement used for compression processing, and arithmetic processing, and performs necessary control of signal processing of the video compression processing section 12 according to the detection result and the arithmetic processing result. In addition, information of detection results and control results regarding predetermined items obtained in the video controlling section 23 is received by the management information controlling section 20 and is used in generation of management information.

An audio controlling section 19 executes various kinds of control regarding audio signal processing operations in this case. Accordingly, the audio controlling section 19 controls the signal processing operations of the audio compression processing section 14 on the basis of predetermined information output according to a signal processing result of the sound pickup section 13, for example. In addition, information of predetermined control results obtained in this audio controlling section 19 is also received by the management information controlling section 20 and is used in generation of management information.

A user interface controlling section 22 is a part for receiving operation information obtained in response to predetermined operations performed on various operation buttons equipped with the image capturing apparatus, and for processing the operation information so as to allow the image capturing apparatus to execute appropriate works corresponding to the operations. The user interface controlling section 22 transmits the operation information obtained in response to predetermined operations to necessary parts in each functional part shown in the drawing here. The management information controlling section 20 utilizes the operation information transmit from the user interface controlling section 22 in generation of predetermined management information.

The management information controlling section 20 generates management information. This management information is data to be recorded on the storage section 17 (a recording medium) together with the recording data according to a predetermined structure. The management information is formed to include information of a predetermined content for managing the video/audio data that is generated by multiplexing each data of the video signals obtained in the image pickup section 11 and the audio signals obtained in the sound pickup section 13. In addition to the above-described video/audio data to be managed, this management information has an information structure and the information content compliant with a format of a recording medium actually supported by the storage section 17.

In addition, as described above, the management information controlling section 20 utilizes information, such as predetermined control information and detection results output from, for example, the camera controlling section 18, the audio controlling section 19, and the video compression processing section 12, in generation of management information.

The above-described management information in this embodiment has a predetermined structure that allow sectioning positions to be set regarding the video/audio data obtained by image capturing/sound capturing. This sectioning position can be defined as, for example, a position (time position) corresponding to a time given to the video/audio data by information such as so-called timestamp.

Additionally, the image capturing apparatus of this embodiment sets this sectioning position at the least in the following manner. Firstly, the image capturing apparatus sets a recording start position of the video/audio data as a sectioning position in response to a user's recording start operation. In addition, the sectioning position can also be set at a middle of the video/audio data from the start to the end of the recording. In this embodiment, this middle sectioning position can be automatically set by a marking process to be described later. Meanwhile, the recording in this embodiment means to record data (compressed video/audio data) of the video signal and the audio signal, obtained by capturing images and sound in the image pickup section 11 and the sound pickup section 13, on the storage section 17. In addition, the compressed video/audio data to be recorded on the recording medium is also referred to as recording data. The recording data in this embodiment is at least data of the video signal. However, in practice, the recording data may include an audio signal whose playback time is synchronized with that of this video signal.

The management information generated by the management information controlling section 20 is transferred to the buffering section 16 and temporarily buffered therein in order to be recorded on a recording media.

The compressed video/audio data transferred from the multiplexing processing section 15 and the above-described management information are buffered in the buffering section 16.

The buffering section 16 transfers a predetermined amount of the buffered compressed video/audio data to the storage section 17 at a predetermined timing, and performs writing. Similarly, the buffering section 17 transfers the buffered management information to the storage section 17 at a predetermined timing, and performs writing. By sequentially performing recording of data in such a manner, the content of the compressed video/audio data obtained by image capturing/sound capturing is recorded together with the management information.

As a specific configuration of the storage section 17, a predetermined recording medium (a storage medium) and a drive capable of recording (and playing) data compatible with this recording medium are included. In this case, the recording medium may be, for example, removable or may be implemented with a drive in a fixed fashion, such as, for example, an HDD (hard disk).

In addition, for example, when the storage section 17 supports DVDs (Digital Versatile Disc), a so-called DVD format such as DVD-Video or DVD-VR (Video Recording) is adopted as a recording format of the storage section 17.

The configuration shown in this drawing shows functions regarding image recording (and sound recording) of an image apparatus through a block configuration, and differs from the actual hardware configuration. In practice, the image capturing apparatus is constituted by, for example, a part that performs image capturing with image pickup devices, a part that performs sound capturing with microphones, a processor that converts a video signal and an audio signal obtained by these parts into digital signals and that executes predetermined digital signal processing, encoding processing, and multiplexing processing, a drive that supports a predetermined recording medium, a CPU, a ROM, a RAM, and a microcomputer that executes various kinds of necessary control processing.

In this embodiment, with the above-described configuration, a marking operation for setting a sectioning position on recording data, to be recorded on a recording media through image recording, is automatically executed while the image recording is being performed. In addition, this embodiment provides a mechanism for marking a noteworthy meaningful position on recording data according to a status during the image recording, so that users' convenience is considered.

Now, the noteworthy meaningful position on recording data is considered. For example, a timing at which some sort of change occurred at a captured subject, or a timing at which a cameraperson pays attention to a subject again and takes an action such as some sort of operation as the cameraperson's intention can be considered to be noteworthy and meaningful in the image contents of the recording data. That is, when the cameraperson pays attention to a subject or when a subject changes into a noteworthy state, there are changes in an operation of an image capturing apparatus and it can be considered that there are often changes in the content of images and audio to be recorded.

Accordingly, in this embodiment, a noteworthy timing on the above-described recording data is acquired as results of detecting a state of an image capturing apparatus, an operation of the image capturing apparatus, or the like on the basis of such facts. According to this detected timing, marking is performed, that is, a sectioning position is set on the recording data.

In this embodiment, for example, the following configurations are possible to perform marking in response to the noteworthy meaningful timing in the course of the recording data.

One is a configuration for allowing marking to be performed in response to a timing at which a user has performed an operation to adjust the zoom during recording.

It is assumed that the image capturing apparatus of this embodiment includes a zoom function. The zoom function is a function for enlarging or reducing captured images by, for example, adjusting an angle of view of the lens optical system in the image pickup section 11. The angle of view is optically adjusted variably by moving the zoom lens in the lens optical system of the image pickup section 11 along the optical axis direction. In addition, a zoom function for enlarging or reducing images not by optical means but by image signal processing is also known. A user who is the cameraperson performs a predetermined operation (a zoom operation) for zoom adjustment on the image pickup section 11, whereby such zoom adjustment works.

Now, circumstances where the cameraperson performs a zoom operation will be considered. The circumstance is when the cameraperson has some sort of editorial intentions, such as, for example, when the cameraperson zooms in (narrows the angle of view) to emphasize a subject and makes the subject look larger in the composition, or when the cameraperson zooms out (broadens the angle of view) from a state where the subject is closed up so that a whose scenery is captured. That is, it can be considered that, as the content of the recording data, the circumstance corresponds to some sort of noteworthy and meaningful changing points.

On that basis, the following conditions can be considered as timings of marking in response to a zoom operation.

a. A time point at which a zoom-in operation is started is set as a marking timing.

b. A time point at which a zoom-in operation is terminated is set as a marking timing.

c. A time point at which a zoom-out operation is started is set as a marking timing.

d. A time point at which a zoom-out operation is terminated is set as a marking timing.

e. A time point at which a predetermined time has passed since a time point of the start of a zoom-in operation is set as a marking timing.

f. A time point at which a predetermined time has passed since a time point of the termination of a zoom-in operation is set as a marking timing.

g. A time point at which a predetermined time has passed since a time point of the start of a zoom-out operation is set as a marking timing.

h. A time point at which a predetermined time has passed since a time point of the termination of a zoom-out operation is set as a marking timing.

i. A time point that is a predetermined time before a time point of the start of a zoom-in operation is set as a marking timing.

j. A time point that is a predetermined time before a time point of the termination of a zoom-in operation is set as a marking timing.

k. A time point that is a predetermined time before a time point of the start of a zoom-out operation is set as a marking timing.

l. A time point that is a predetermined time before a time point of the termination of a zoom-out operation is set as a marking timing.

For example, the marking is set at a timing at which any one of these conditions is met.

The above-described conditions a-d employ timings directly corresponding to the start/termination of a zoom-in/zoom-out operation, and can be constituted by, for example, simple algorithms.

In addition, when timings at which a predetermined time has passed since a time point of the start/termination of a zoom-in/zoom-out operation is set as marking timings like the conditions e-l, the following advantages exist. For example, while the zoom lens is moving in response to a zoom operation, a captured image also changes to enlarge/reduce in response to this. For this reason, if the timing directly corresponding to the start/termination of a zoom-in/zoom-out operation is set as the marking timing, the image changes in response to the zoom operation immediately before or immediately after this marking timing. In addition, the captured composition is often shifted at the timing of the start/termination of the zoom-in/zoom-out operation. That is, a sectioning position on the recording data is set at a point where a change in images is great, which make it difficult to see when playback of the recording data is performed using the marked sectioning position as a start point. By providing a predetermined time from the operation timing like the conditions e-l, the marking timing is set for a state where images are stable.

In addition, regarding the conditions i-l, the timing that is a predetermined time before a time point of the start/termination of a zoom operation is set as a sectioning position. Such marking is possible while the recording is performed in real-time. In the case of recording digital recording data in a manner of this embodiment, the recording data is temporarily buffered, for example, in the buffering section 16, and then sequentially written on a recording medium at a predetermined timing. That is, a certain amount of information of images and audio captured before the current time point is not recorded on a recording medium but is buffered. In addition, depending on the format of the recording media, the sectioning position of this embodiment is included in a structure of the management information and is written in an area on the recording media that is logically different from that for the entity of the recording data (compressed video/audio data). In this case, the management information is held in a buffer until the completion of the recording, for example, and is written on a recording medium at a predetermined timing corresponding to the completion of the recording. For this reason, a past time on the recording data can be set (marked) as a sectioning position by rewriting this management information as long as the management information is buffered.

In addition, it is possible to combine the above-described conditions a-l and the following marking execution determination criterion. More specifically, the execution determination criterion is that this marking is executed if a predetermining time or more has passed from the timing of the lastly executed marking to the timing of this marking that is decided according to one of the above-described conditions a-l, whereas this marking is not executed if the predetermined time has not passed.

When such an execution determination criterion is not set, marking positions are set every time a cameraperson performs a zoom operation during a short period of time due to a reason that the composition is not well set, for example. That is, marking positions more than the necessary number may be set during a short period of time.

Another configuration is that for allowing marking to be performed according to a moving state (a movement state) of an image capturing apparatus due to panning or tilting during the recording.

The image capturing apparatus of this embodiment is generally used in a manner that a cameraperson performs image capturing while carrying the image capturing apparatus and looking through a viewfinder or looking at a display screen. On the basis of this, when a direction change equal to or greater than a predetermined angle is occurred as a moving state of the image capturing apparatus, for example, a circumstance, such as the cameraperson has an intention to change a subject or a significant change has occurred in a scene because an identical subject moves greatly, can be expected. As in the case of the above-described zoom operation, it can be considered as a noteworthy and meaningful timing as recording data.

In this embodiment, the moving state (movement state) of the image capturing apparatus can be grasped on the basis of detection information for motion blurring correction of the movement detecting section 21. The movement detecting section 21 includes a geomagnetic sensor, a gyro, and an acceleration sensor, thereby knowing a rotation of the image capturing apparatus (a direction), an amount of movement of the image capturing apparatus, and a moving direction in the horizontal direction. In addition, a rotation of an image capturing apparatus in a capturing direction, an amount of movement of the image capturing apparatus, and a moving direction in the up and down (vertical) direction can be known.

The following conditions can be considered as marking timings of this case.

a. A time point at which a rotation of an image capturing apparatus in the horizontal or vertical direction is started is set as a marking timing.

b. A time point at which a rotation of an image capturing apparatus in the horizontal or vertical direction is terminated is set as a marking timing.

c. A time point at which a liner movement of an image capturing apparatus in the horizontal or vertical direction is started is set as a marking timing.

d. A time point at which a liner movement of an image capturing apparatus in the horizontal or vertical direction is terminated is set as a marking timing.

e. A time point at which a predetermined time has passed since a time point of the start of a rotation of an image capturing apparatus in the horizontal or vertical direction is set as a marking timing.

f. A time point at which a predetermined time has passed since a time point of the termination of a rotation of an image capturing apparatus in the horizontal or vertical direction is set as a marking timing.

g. A time point at which a predetermined time has passed since a time point of the start of a linear movement of an image capturing apparatus in the horizontal or vertical direction is set as a marking timing.

h. A time point at which a predetermined time has passed since a time point of the termination of a linear movement of an image capturing apparatus in the horizontal or vertical direction is set as a marking timing.

In this case, the marking is also set at a timing at which any one of these conditions is met.

In addition, also in this case, it is possible to combine a marking timing execution determination criterion similar to that in the case of zooming (this marking is executed if a predetermined time or more has passed since the timing of the lastly executed marking) with the above-described conditions. This can suppress setting of unnecessary markings.

Another configuration is that for allowing marking to be performed on the basis of a change in a subject distance obtained by capturing images during the recording.

The image capturing apparatus of this embodiment includes an auto focus function. The auto focus function is a function for controlling the image capturing apparatus so that a subject focused state is automatically obtained not by manual operation of a focus lens by a user. The auto focus control generally determines a subject distance that is a distance to a subject or information equivalent to this (an evaluation value (contrast (difference in brightness levels) information) obtained from a video signal on the basis of the contrast method, for example), drives the focus lens to move according to this subject distance, thereby obtaining the focused state. Here, a fact that the subject distance shows a certain characteristic change means that it is highly likely that the user performing the image capturing intentionally applies some sort of change to the captured content. That is, when the subject distance shows a characteristic change, the content of the recording data is also considered to be noteworthy and meaningful.

For example, the followings can be cited as conditions of marking timings of this case.

a. A time point at which a continuous decrease or a continuous increase of a subject distance stops is set as a marking timing.

b. A time point at which a decreasing or increasing trend of a change of a subject distance starts is terminated is set as a marking timing.

c. A time point at which a predetermined time has passed since a time point of the stop of a continuous decrease or a continuous increase of a subject distance is set as a marking timing.

d. A time point at which a predetermined time before a time point of the start of a decreasing or increasing trend of a change of a subject distance is set as a marking timing.

e. A time point at which a continuous decreasing or a continuous increasing subject distance falls within a predetermined range is set as a marking timing.

f. A time point that is a predetermined time after or before a time point at which a continuous decreasing or a continuous increasing subject distance falls within a predetermined range is set as a marking timing.

In this case, it is also possible to include a marking timing execution determination criterion (this marking is not executed unless a predetermined time or more has passed since the timing of the last executed marking) in the above-described conditions.

Another configuration is that for detecting a change regarding a predetermined feature of an input signal (a video signal or an audio signal) obtained by image capturing or sound capturing, and for perform marking according to this detection result. The timing at which an input signal changes can be also considered as a noteworthy and meaningful timing as a content of the recording data. Features of an input signal that can be utilized in marking will be illustrated below.

A. Luminance of image: The luminance can be detected on the basis of a luminance signal component of a video signal.

B. Color of image: It can be considered that particularly detecting skin colors in a specific area of an image as a feature is effective when a human figure is set as a subject.

C. Complexity of content of image: The complexity can be determined by digitizing a correlation between a coefficient that decides a compression ratio used when a video signal is compressed and encoded by the video compression processing section 12 and an amount of compressed information compressed using the coefficient.

D. Volume of captured audio: The volume can be detected on the basis of a level of an audio signal.

E. Localization of sound source regarding captured audio: When the image capturing apparatus of this embodiment supports multichannel sound capturing, a change in localization of a sound source of the captured sound can be recognized on the basis of information of an audio signal of each channel obtained by the sound capturing. For example, the localization can be obtained as an audio signal processing result of the sound pickup section 13.

F: Peripheral noises: For example, when the sound pickup section 13 includes a noise canceller that cancels external noises, a change in the noises can be detected on the basis of a change in a controlling amount of this noise canceller.

When a predetermined change occurs in any one of the features of an input signal shown as the above-described A-F, it can be considered that a noteworthy and meaningful change occurs in the content of captured images at that time.

In addition, the followings are cited as marking timings of this case.

a. A time point at which it is determined that a value (a feature value) indicating a feature of an input signal continues to increase or decrease and then becomes constant (or falls within a predetermined range of values) is set as a marking timing.

b. A time point at which it is determined that a feature value of an input signal starts to increase or decrease is set as a marking timing.

c. A time point at which a predetermined time has passed since it is determined that a value (a feature value) indicating a feature of an input signal continues to increase or decrease and then becomes constant (or falls within a predetermined range of values) is set as a marking timing.

d. A time point at which a predetermined has passed since it is determined that a feature value of an input signal starts to increase or decrease is set as a marking timing.

In this case, for example, the marking is also set at a timing at which any one of these conditions is met. Limiting the application of the above-described conditions to a specific area of an image area for one frame in the case of images and to a specific frequency band in the case of audio is also possible.

In this case, it is possible to include a marking timing execution determination criterion (this marking is not executed unless a predetermined time or more has passed since the timing of the lastly executed marking) in the above-described conditions.

The configuration for performing marking according to the movement state of the image capturing apparatus itself due to panning or tilting during the recording has been described before. A configuration for allowing marking to be performed on the basis of particularly a position change according to the movement distance as the movement state is also possible.

More specifically, for example, when a user carrying an image capturing apparatus moves to a position apart from the position of an original location by a predetermined distance, the user is in a location where the environment is different from that of the original location. If the image capturing is performed during this period, the timing at which such a position change occurs can be considered as a noteworthy timing as the recording data.

The image capturing apparatus of this embodiment can grasp the some degree of distance change by utilizing the position information detected by the position detecting section 24.

The following conditions can be considered as marking timings of this case.

a. A time point at which a distance between a position detected at the time of the last marking and the present position becomes equal to or greater than a predetermined value is set as a marking timing.

b. A time point at which a predetermined time has passed since a time point at which a distance between a position detected at the time of the last marking and the present position becomes equal to or greater than a predetermined value is set as a marking timing.

c. A time point that is a predetermined period before a time point at which a distance between a position detected at the time of the last marking and the present position becomes equal to or greater than a predetermined value is set as a marking timing.

d. A time point at which a distance between a predetermined reference position and the present position becomes equal to or greater than a predetermined value is set as a marking timing.

e. A time point at which a predetermined time has passed since a time point at which a distance between a predetermined reference position and the present position becomes equal to or greater than a predetermined value is set as a marking timing.

f. A time point that is a predetermined period before a time point at which a distance between a predetermined reference position and the present position becomes equal to or greater than a predetermined value is set as a marking timing.

g. A time point at which a distance between a predetermined reference position and the present position becomes equal to or smaller than a predetermined value is set as a marking timing.

h. A time point at which a predetermined time has passed since a time point at which a distance between a predetermined reference position and the present position becomes equal to or smaller than a predetermined value is set as a marking timing.

i. A time point that is a predetermined period before a time point at which a distance between a predetermined reference position and the present position becomes equal to or smaller than a predetermined value is set as a marking timing.

In this embodiment, a data position treatable as a noteworthy and meaningful content in recording data is detected and recognized utilizing functions included in the image capturing apparatus based on the state of operation executed by the image capturing apparatus, the operation result, and the state of the image capturing apparatus in this manner. On the basis of this detection result or recognition result, the timing of marking is set. This allows sectioning positions of recording data to be set automatically. In addition, the result of setting the sectioning positions specifies a suitably meaningful data positions according to the content of the recording data.

Subsequently, a configuration for allowing the image capturing apparatus of this embodiment to execute marking will be described for some of the above-described condition setting examples.

Firstly, a configuration for performing marking in response to a zoom operation will be described using FIG. 2 and FIG. 3. Meanwhile, a case where an execution determination criterion that "marking is not performed unless one minute or more has passed from the last marking to the set marking timing" is set under a condition that "a time point that is one second before a time point at which a zoom-in operation is started is set as marking timing" is cited here.

Figure 2:
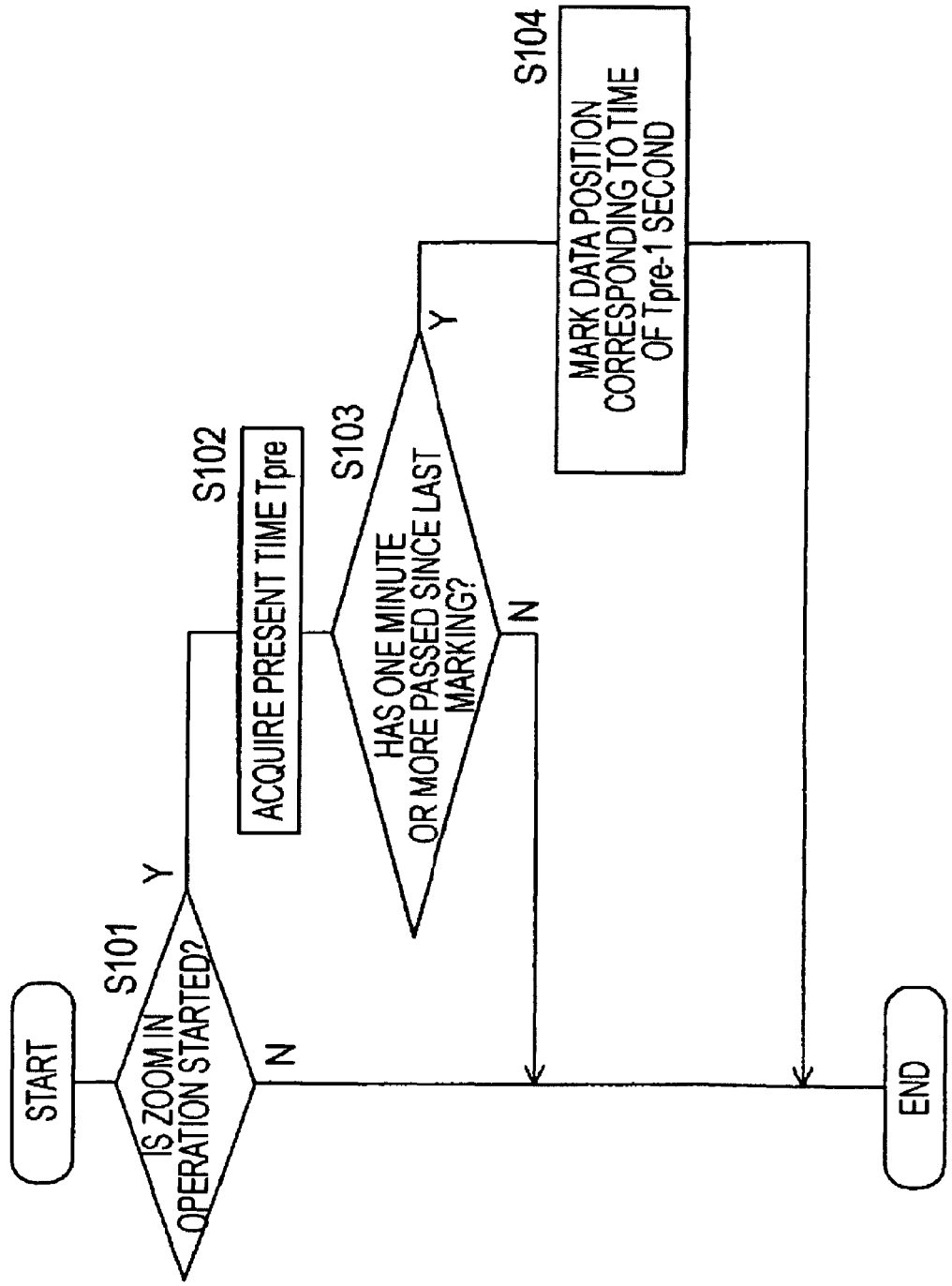
FIG. 2 is a flowchart showing an example of a procedure for a marking process in response to a zoom operation.

A flowchart of FIG. 2 shows a procedure according to an algorithm for executing marking in response to a zoom-in operation. The procedure of this FIG. 2 can be seen as, for example, processing executed by the management information controlling section 20.

Firstly, a start of a zoom-in operation is waited for at STEP S101. For example, when an operation for zoom-in is started by a user, the user interface controlling section 22 outputs, in response to this, information indicating that the zoom-in operation has started to the management information controlling section 20. The management information controlling section 20 recognizes that the zoom-in operation has started by receiving this information, and advances the process to STEP S102.

At STEP S102, the management information controlling section 20 acquires the present time Tpre. In this case, the time may be information of a playback time corresponding to the recording data. For example, a current time based on a starting time point of recording data may be acquired as the preset time Tpre.

At the following STEP S103, whether or not one minute or more has passed since the final (last) marking is determined. To do this, a time for a sectioning position set by the last marking may be compared with the present time Tpre acquired at STEP S102 described above.

If a negative determination result that one minute or more has not passed is obtained at STEP S103, it is determined that the marking should not be performed. Thus, the processing is terminated without performing the marking. On the other hand, if a positive determination result that one minute or more has passed is obtained, the process proceeds to STEP S104. A position on the recording data corresponding to Tpre−1 second is set as a sectioning position. That is, the marking is performed at a position on the recording data for a time point that is one second before the time point of the start of the zoom-in operation.

By performing the marking at one second before the start of the zoom-in operation in this manner, stable images before the zooming are displayed first and then shifted to images showing a subject enlarging in response to the zoom-in when playback is started from this marking position, for example. By allowing stable images to be displayed at first in this manner, viewability for users is considered.

Figure 3:
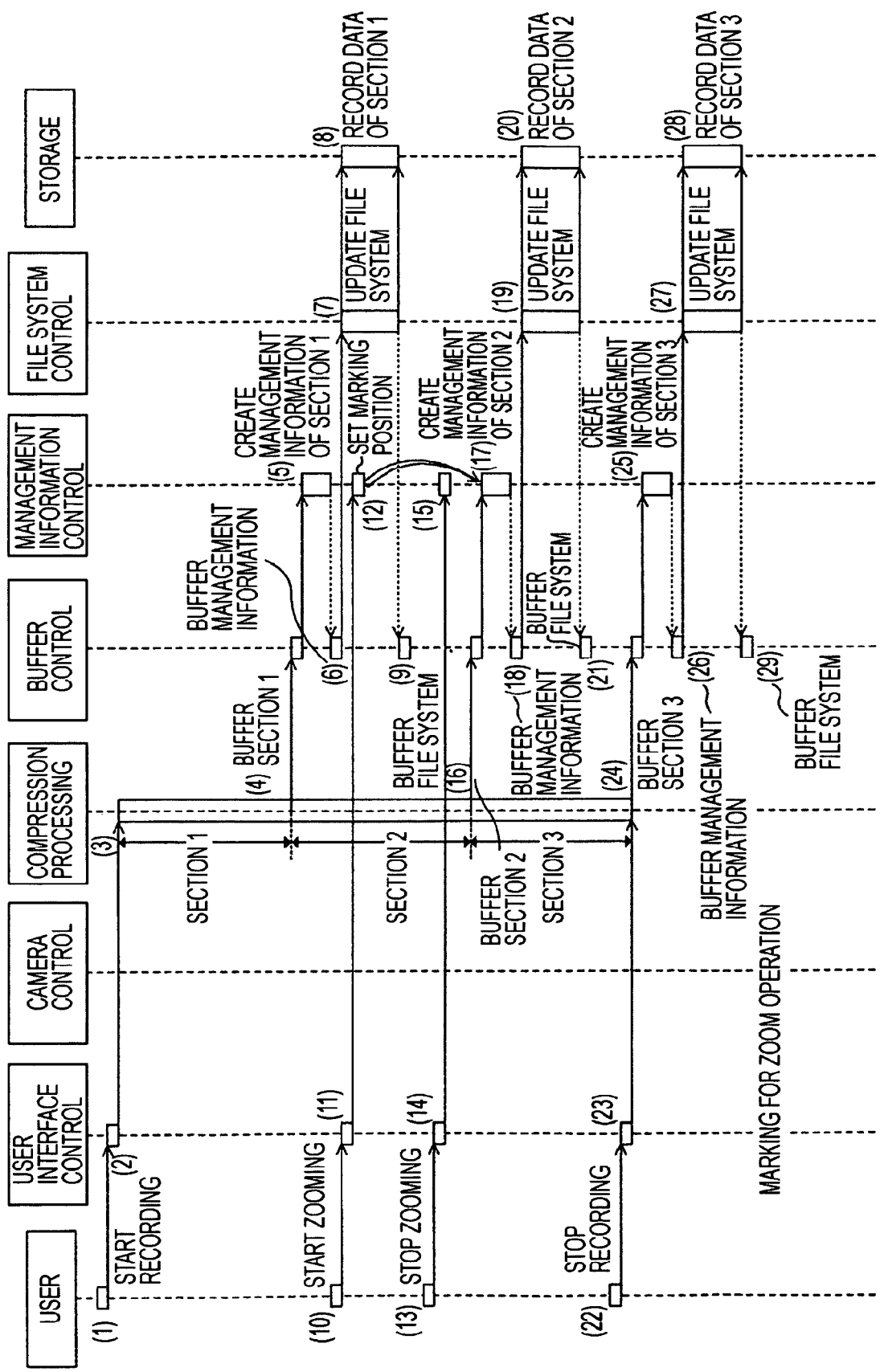
FIG. 3 is a diagram showing an example of operations, including a marking process in response to a zoom operation, of a system of an image capturing apparatus at the time of recording.

FIG. 3 is executed by an image capturing apparatus between a start and an termination of recording of one piece of recording data, and is a specific example of a sequence of processing for recording the recording data including processing for marking in response to a zoom operation. The marking processing in this processing sequence employs the condition and the execution determination criterion shown in FIG. 2.

In addition, description of this drawing is given according to numerals indicating steps shown with ( ) in the drawing. In this drawing, the steps are shown in association with user operations/actions, operations of user interface control, camera control, compression processing, buffer control, management information control, file system control, and the storage section 17. Regarding each of the above-described operations, the user interface controlling section 22 performs the user interface control and the camera controlling section 18 performs the camera control. In addition, the video compression processing section 12, the audio compression processing section 14, and the multiplexing processing section 15 perform the compression processing, and the buffer control is performed by the buffering section 16. The management information controlling section 20 performs the file system control. Information serving as a file system is also management information necessary for managing the recording data recorded on, for example, a recording medium so that the recording data is appropriately played back in a unit of file. Storage (storing of data) is executed in the storage section 17. In addition, the processing in this drawing is in accordance with the course of time. The time advances as the process proceeds from the top to the bottom of the drawing. These points are the same regarding FIG. 5, FIG. 7, and FIG. 9, which will be described later.

STEP 1: A user, whose is a cameraperson, of an image capturing apparatus performs a predetermined operation to start recording of recording data.

STEP 2: Operation information corresponding to the recording start operation is transmitted to the user interface controlling section 22.

STEP 3: In response to the user interface controlling section 22 receiving the recording start operation, the video compression processing section 12 starts compression encoding processing, performed by the video compression processing section 12, on a video signal obtained by the image pickup section 11.

Although not shown in the drawing, in response to the user interface controlling section 22 receiving the recording start operation, the audio compression processing section 14 starts compression encoding processing on an audio signal obtained by the sound pickup section 13 at a timing synchronized with that of the video data. The multiplexing processing section 15 then generates recording data of multiplexed compressed video data and compressed audio data.

STEP 4: The recording data generated in the above-described manner is sequentially transferred to, written in, and buffered (accumulated) in the buffering section 16 so that the recording data is sectioned in a certain data size based on, for example, an actual buffer size of the buffering section 16 and the speed of the compression encoding processing. At this STEP 4, a section 1 from the top of the compressed and encoded data to a certain data position is transferred to and buffered in the buffering section 16.

Data obtained by compressing and encoding video/audio signals obtained by image capturing/sound capturing thereafter belongs to a section 2.

STEP 5: In response to buffering of the compressed and encoded data of the section 1, management information for the compressed and encoded data of the section 1 is created as the management information control.

STEP 6: The management information corresponding to the compressed and encoded data of the section 1 created at STEP 5 is transferred to and buffered in the buffering section 16.

STEP 7: An update of a file system according to the recoding result of the section 1 is performed at a timing corresponding to recording of the compressed and encoded data of the section 1 on a recording medium at STEP 8, which will be described next. At this time, for example, the management information controlling section 20 reads out data of file system held in the buffering section 16, and rewrites the content according the record of the data of the section 1.

STEP 8: The compressed and encoded data of the section 1 is read out from the buffering section 16 and is transferred to the storage 17, and is written and stored on the recording medium.

STEP 9: If the update of the file system at STEP 7 is completed, the data of the update-completed file system is written back in and buffered in the buffering section 16. At this time, if data of the unupdated file system exists in the buffering section 16, the data of the unupdated file system is overwritten by the data of the updated file system.

STEP 10: A user performs an operation for starting zoom-in. As shown in the drawing, a timing of starting the zoom-in operation is while the compressed and encoded data of the section 1 is being recorded on the recording medium and while the video compression processing section 12 is executing generation of compressed and encoded data of the section 2 that follows the section 1. That is, the start of this zoom-in operation is performed at a timing within a period during which the images of the data of the section 2 are captured.

STEP 11: Upon detecting the zoom-in start operation of the above-described STEP 10, the user interface controlling section 22 notifies the management information controlling section 20 that the zoom-in start operation is performed. Although not shown in the drawing, upon detecting the zoom-in start operation, the user interface controlling section 22 notifies the management information controlling section 20 and also sends the information of the zoom-in operation to, for example, a camera controlling section 18. The camera controlling section 18 controls the zoom mechanism of the image pickup section 11 to execute control for zoom adjustment.

STEP 12: The management information controlling section 20 acquires a timing of the zoom-in start operation notified at STEP 11 described above as, for example, the present time Tpre (STEP S102), and sets a time that is one second before this present time Tpre as a sectioning position (a marking position) of the recording data (STEP S104). For the confirmation, this STEP 12 is a timing within a period during which the data of the section 2 is being compressed and encoded. That is, the sectioning position (the marking position) for the timing of the present time Tpre−1 second set at STEP 12 resides within the recording data of the section 2.

If the start of the zoom operation shown as STEP 10 is not the first one but the second or following one and a predetermined time (one minute) has not passed from the marking position set in response to a start of the last zoom operation, setting of the marking position at STEP 12 is not executed according to the procedure of FIG. 2 (STEP S103).

STEP 13: The user stops the zoom-in operation.

STEP 14: The user interface controlling section 22 detects the above-described stop of the zoom-in operation.

STEP 15: The user interface controlling section 22 notifies the management information controlling section 20 of the termination of the zoom-in operation. Although not shown in the drawing, the user interface controlling section 22 also notifies the camera controlling section 18 of the termination of the zoom-in operation. In response to this notification, the camera controlling section 18 stops the zoom control.

STEP 16: The compressed and encoded data of the section 2 following the section 1 is buffered in the buffering section 16. Thereafter, processing for generating compressed and encoded data of a section 3 is executed.

STEP 17: In response to buffering of the compressed and encoded data of the section 2, management information for the compressed and encoded data of the section 2 is created as the management information control. At this time, the management information is created so that the marking position (the sectioning position) of the recording data set at preceding STEP S12 is reflected. As described before, in this embodiment, the management information has a structure to store information indicating sectioning positions of recording data.

STEP 18: The management information for the compressed and encoded data of the section 2 created at STEP 17 is transferred to the buffering section 16, and is buffered.

STEP 19: At a timing corresponding to recording of the compressed and encoded data of the section 2 on the recording medium at STEP 20, an update of the file system according to the recording result of the section 2 is performed.

STEP 20: The compressed and encoded data of the section 2 is read out from the buffering section 16 and is transferred to the storage 17, and is written and stored on the recording medium.

STEP 21: In response to the completion of the update of the file system at STEP 19, the data of the update-completed file system is written back to the buffering section 16 and is buffered.

STEP 22: An operation for stopping the recording of the recording data is performed.

STEP 23: The user interface controlling section 22 detects that recording stop operation of the recording data has been performed. In response to this, for example, the video compression and encoding processing and the audio compression and encoding processing are stopped.

STEP 24: In response to the recording stop operation of the recording data, the buffering section 16 that performs the buffering control buffers the compressed and encoded data of the section 3.

STEP 25: In response to buffering of the compressed and encoded data of the section 3, management information for the compressed and encoded data of the section 3 is created as the management information control.

STEP 26: The management information for the compressed and encoded data of the section 3 created at STEP 24 is transferred to the buffering section 16 and is buffered.

STEP 27: At a timing corresponding to recording of the compressed and encoded data of the section 3 on the recording medium at STEP 25, an update of the file system according to the recording result of the section 3 is performed.

STEP 28: The compressed and encoded data of the section 3 is read out from the buffering section 16, is transferred to the storage 17, and is written and stored on the recording medium.

STEP 29: In response to the completion of the update of the file system at STEP 27, the data of the update-completed file system is written back to the buffering section 16 and is buffered. In this case, the data of the file system is written and stored on the recording medium at a necessary timing thereafter.

Subsequently, a configuration for performing marking according to a movement state of the image capturing apparatus itself during recording will be described.

In this case, a condition that "movement of an image capturing apparatus in the horizontal direction (which may be a rotation or a linear movement) has once started and a time point at which a predetermined time of one second has passed from a time point at which the movement has stopped is set as a marking timing" is set. In addition, an execution determination criterion that "marking is not performed unless one minute or more has passed from the last marking to the set marking timing" is also included. Furthermore, an execution determination criterion that "marking is performed if the recording is continued (has not finished) at the time corresponding to the set marking timing, whereas marking is not performed if the recording is not continued (has finished)" is additionally included. In this case, since the marking is performed at a time after the timing of detecting the end of the movement of the image capturing apparatus in the horizontal direction, the recording may be finished at the timing of detecting the end of the movement. That is, the latter execution determination criterion solves the processing contradiction that marking processing is executed in spite of that the recording has finished.

Figure 4:
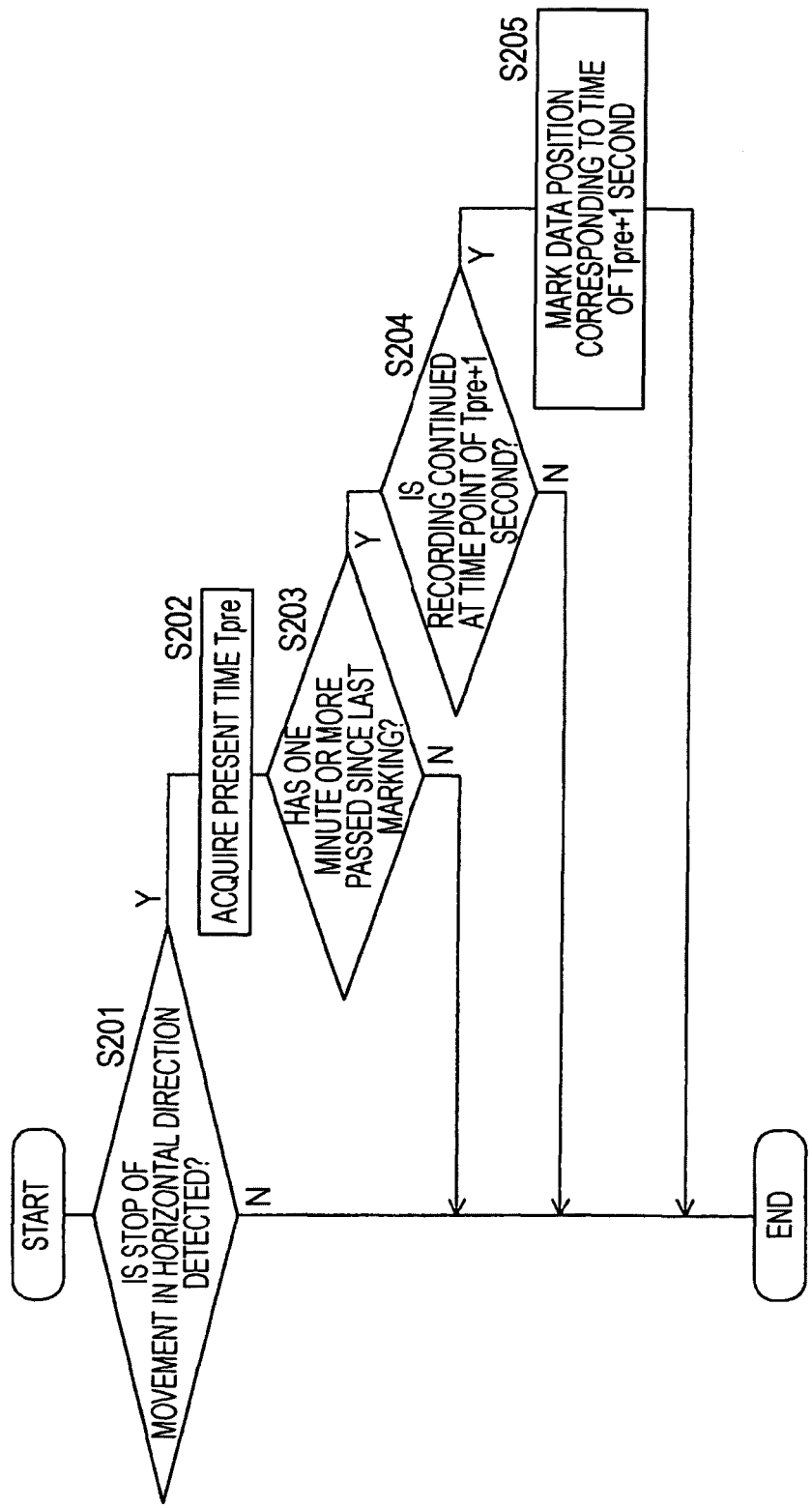
FIG. 4 is a flowchart showing an example of a procedure for a marking process according to a detection result of movement of an image capturing apparatus itself.

A flowchart of FIG. 4 shows an example of a procedure for executing marking according to a movement state of an image capturing apparatus.

Firstly, a stop of the movement is waited for at STEP S201 after movement of an image capturing apparatus itself has started in the horizontal direction, for example. As described above, this determination is possible on the basis of information detected by the movement detecting section 21. In the drawing, the management information controlling section 20 is configured to receive the information of the movement detecting section 21, for example, through the camera controlling section 18. Alternatively, this determination is also possible on the basis of a result of performing detection of movement regarding a captured image through image signal processing. If a positive determination result is obtained at STEP S201, the process proceeds to STEP 202 and the following steps.

At STEP S202, the present time Tpre is acquired.

At STEP S203, whether or not one minute or more has passed since the final (last) marking is determined. If a negative determination result is obtained, the processing is terminated without performing the marking. On the other hand, if a positive determination result that one minute or more has passed is obtained, the process proceeds to STEP S204.

At STEP S204, whether or not the recording is continued at a time point of one second after the present time Tpre is determined. To do this, for example, the image capturing apparatus may wait for one second from the present time Tpre acquired at STEP S202 and then check an operation state of the image capturing apparatus at this time. If a negative determination result is obtained at this STEP S204, the process shown in this drawing is terminated without performing the marking. This solves the processing contradiction that the marking processing is executed in spite of that the recording has finished.

On the other hand, if a positive determination result is obtained at STEP S204, a position on recording data corresponding to the present time Tpre+1 second is set as a sectioning position at STEP S205. That is, marking is performed at the position on the recording data for a time point that is one second after the time point of the start of the zoom-in operation. By performing the marking at the timing one second after the stop of the movement in this manner, it is possible to play back images from a state where blurring of images due to the movement of the image capturing apparatus is removed when the images are played back from, for example, this marking position since the playback is performed from the time point that is one second after the stop of the movement of the image capturing apparatus.

Figure 5:
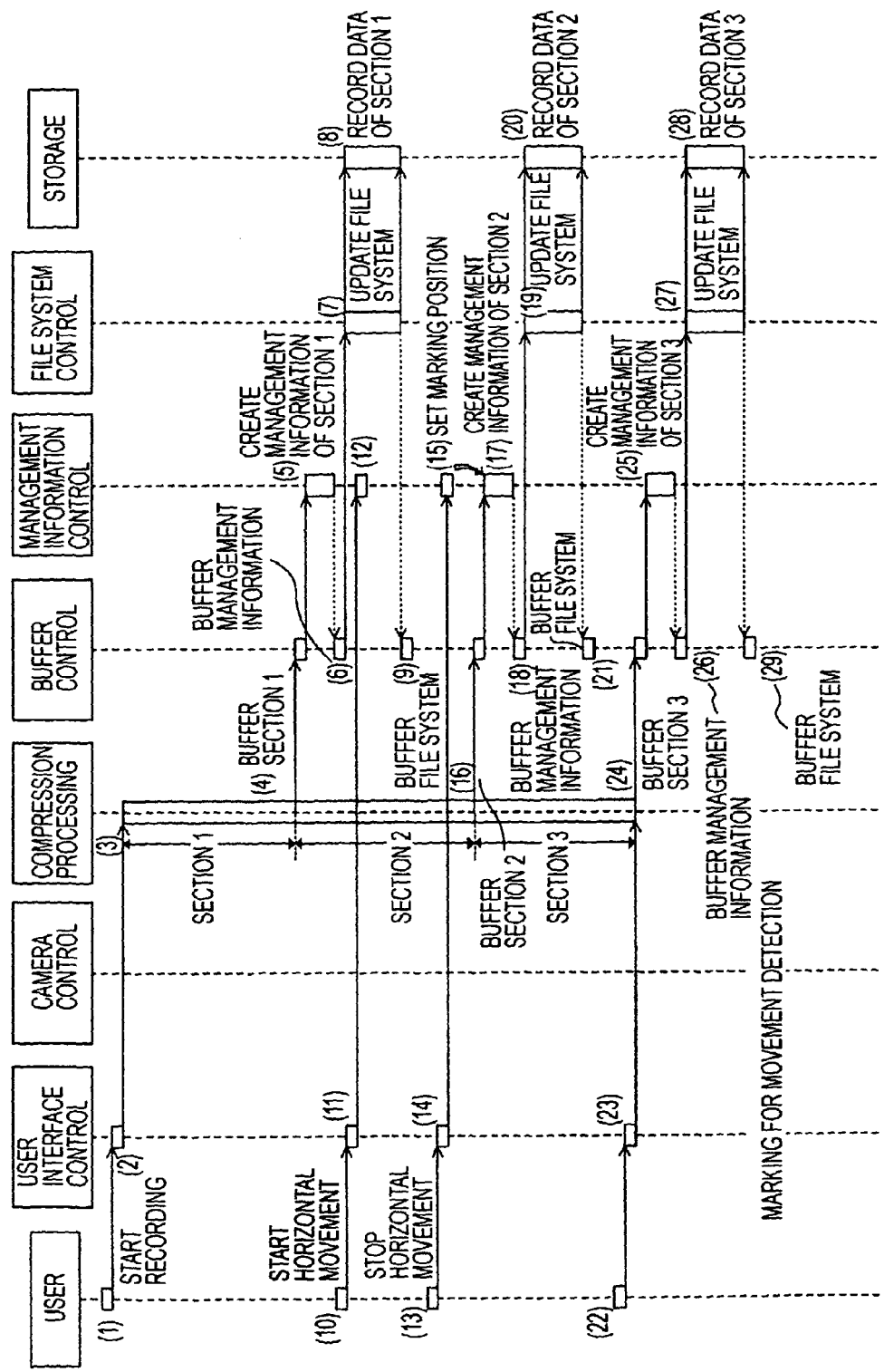
FIG. 5 is a diagram showing an example of operations, including a marking process according to a detection result of movement of an image capturing apparatus itself, of a system of an image capturing apparatus at the time of recording.

FIG. 5 is executed by an image capturing apparatus between a start and a termination of recording of one piece of recording data, and is a specific example of a sequence of processing for recording the recording data including processing for marking according to movement (in the horizontal direction) of the image capturing apparatus. This processing sequence will be described according to numerals indicating steps shown with ( ) in the drawing. The marking processing in this processing sequence employs the condition and the execution determination criteria shown in FIG. 4.

Since STEP 1 to STEP 6 are similar to STEP 1 to STEP 6 of FIG. 3, the description is omitted here.

In addition, writing of data of a section 1, an update of a file system, and buffering of STEP 7 to STEP 9 are also similar to those of FIG. 3.

STEP 10: In this drawing, for example, an action involving movement of an image capturing apparatus, such as movement of a cameraperson (a user) carrying the image capturing apparatus or changing of a direction of the image capturing apparatus, is started as this STEP 10. In this case, a timing of the start of the movement of the image capturing apparatus is while compressed and encoded data of a section 1 is being recorded on a recording medium and while the video compression processing section 12 is executing generation of compressed and encoded data of a section 2 that follows the section 1.

STEP 11: In response to the start of the movement of the image capturing apparatus at the above-described STEP 10, the movement detecting section 21 outputs information of the movement state (a moving direction and an amount of the movement). The user interface controlling section 22 receives such detection information from the movement detecting section 21.

STEP 12: The user interface controlling section 22 recognizes the amount of movement and the moving direction regarding vertical/horizontal components from, for example, the detection information of the movement detecting section 21. On the basis of this recognition result, the user interface controlling section 22 notifies the management information controlling section 20 that the movement in the horizontal direction has started. Meanwhile, since the marking condition used here is one second after a time point of a termination of the movement in the horizontal direction, setting of marking is not performed at STEP 12.

STEP 13: The user's action for moving the image capturing apparatus in the horizontal direction is stopped. This terminates the movement of the image capturing apparatus in the horizontal direction.

STEP 14: Detection information of the movement detecting section 21 in response to the termination of the movement of the image capturing apparatus in the horizontal direction is input to the user interface controlling section 22. The user interface controlling section 22 recognizes that the movement of the image capturing apparatus in the horizontal direction has been terminated on the basis of the input detection information of the movement detecting section 21, and notifies the management information controlling section 20 that the movement of the image capturing apparatus in the horizontal direction has been terminated.

STEP 15: The management information controlling section 20 notified that the movement of the image capturing apparatus in the horizontal direction has been terminated acquires a timing of the termination of the movement in the horizontal direction notified at the above-described STEP 14 as, for example, the present time Tpre (STEP S202 of FIG. 4). The management information controlling section 20 sets a time that is one second after the this present time Tpre as a sectioning position (a marking position) of the recording data (STEP S205). Meanwhile, the sectioning position (the marking position) set in this manner is also set within recording data of a section 2.

Since STEP 16 to STEP 29 are similar to those of FIG. 3, the description is omitted here.

However, at the time of creation of management information for the compressed and encoded data of the section 2 at STEP 17, the creation is performed so that the marking position set at the above-described STEP 15 is reflected.

Subsequently, a configuration for performing marking according to a subject distance will be described.

Here, a condition that "a time point at which a subject distance falls within a range equal to or smaller than a predetermined value is set as a marking timing" is set. In addition, a case where an execution determination criterion that "marking is not performed unless one minute or more has passed from the last marking position to the set marking timing" is included is cited as an example.

Figure 6:
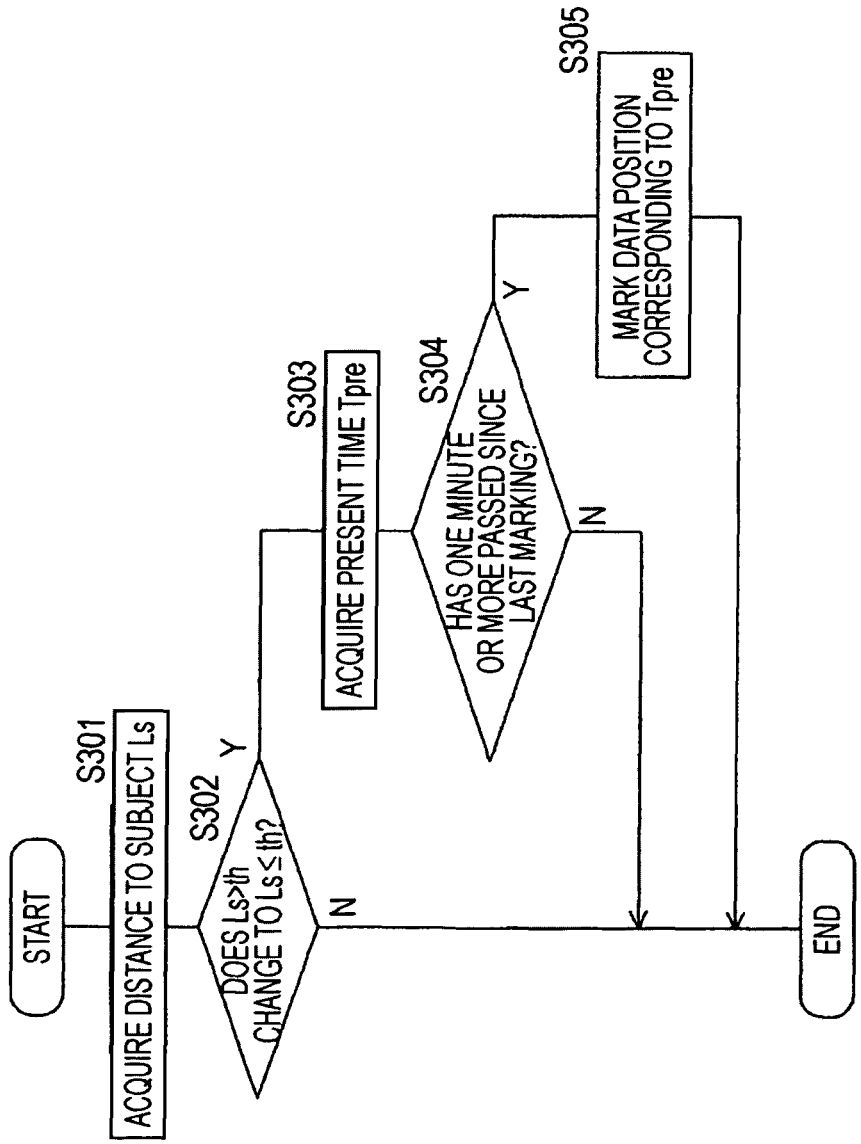
FIG. 6 is a flowchart showing an example of a procedure for a marking process according to a distance to a subject.

A flowchart of FIG. 6 shows an example of a procedure for executing marking according to a subject distance.

Firstly, for example, the management information controlling section 20 receives information of a subject distance Ls at STEP S301. At this time, the management information controlling section 20 receives information of the subject distance that is constantly determined by, for example, the camera controlling section 18 for the purpose of the auto focus control. Meanwhile, the information of the subject distance used here indicates every kinds of control values determined in the auto focus control including an evaluation value obtained on the basis of the contrast of a video signal in the case of the auto focus control based on the contrast method, for example.

At STEP 302, a determination of "whether or not a state is shifted from a state where the subject distance Ls is greater than a predetermined threshold to a state where the subject distance Ls becomes equal to or smaller than the threshold" is performed regarding the subject distance Ls received at STEP S301. Suppose that the threshold th is 5 m, for example. Whether or not the state is shifted from a state where the subject distance Ls is greater than 5 m to a state where the subject distance Ls becomes equal to or smaller than 5 m is determined. If a negative determination result that such a change is not observed is obtained, the processing shown in this drawing is terminated without performing marking. If a positive determination result is obtained, the process proceeds to STEP S303.

At STEP S303, the present time Tpre is acquired.

At the next STEP S304, whether or not a predetermined time (one minute) or more has passed from the final (last) marking to the time of this marking position is determined. If a negative determination result is obtained, the processing is terminated without performing marking. On the other hand, if a positive determination result that one minute or more has passed is obtained, the process proceeds to STEP S305.

At STEP S305, a position on the recording data corresponding to the present time Tpre acquired at STEP S303 is set as a sectioning position (a marking position).

In such processing, for example, the threshold th at STEP S302 may be set in the following manner. More specifically, a value corresponding to substantially focused subject distance is set as the threshold th. In such a case, when a user changes a subject to one existing at a position farther than a subject distance corresponding to the threshold th, the marking is performed in response to a state where the subject is substantially focused on after the auto focus control operates. That is, as a recording result, a position on the image content brought into a focused state from a state where a subject temporarily becomes out-of-focus after the subject has changed is set as a sectioning position.

Figure 7:
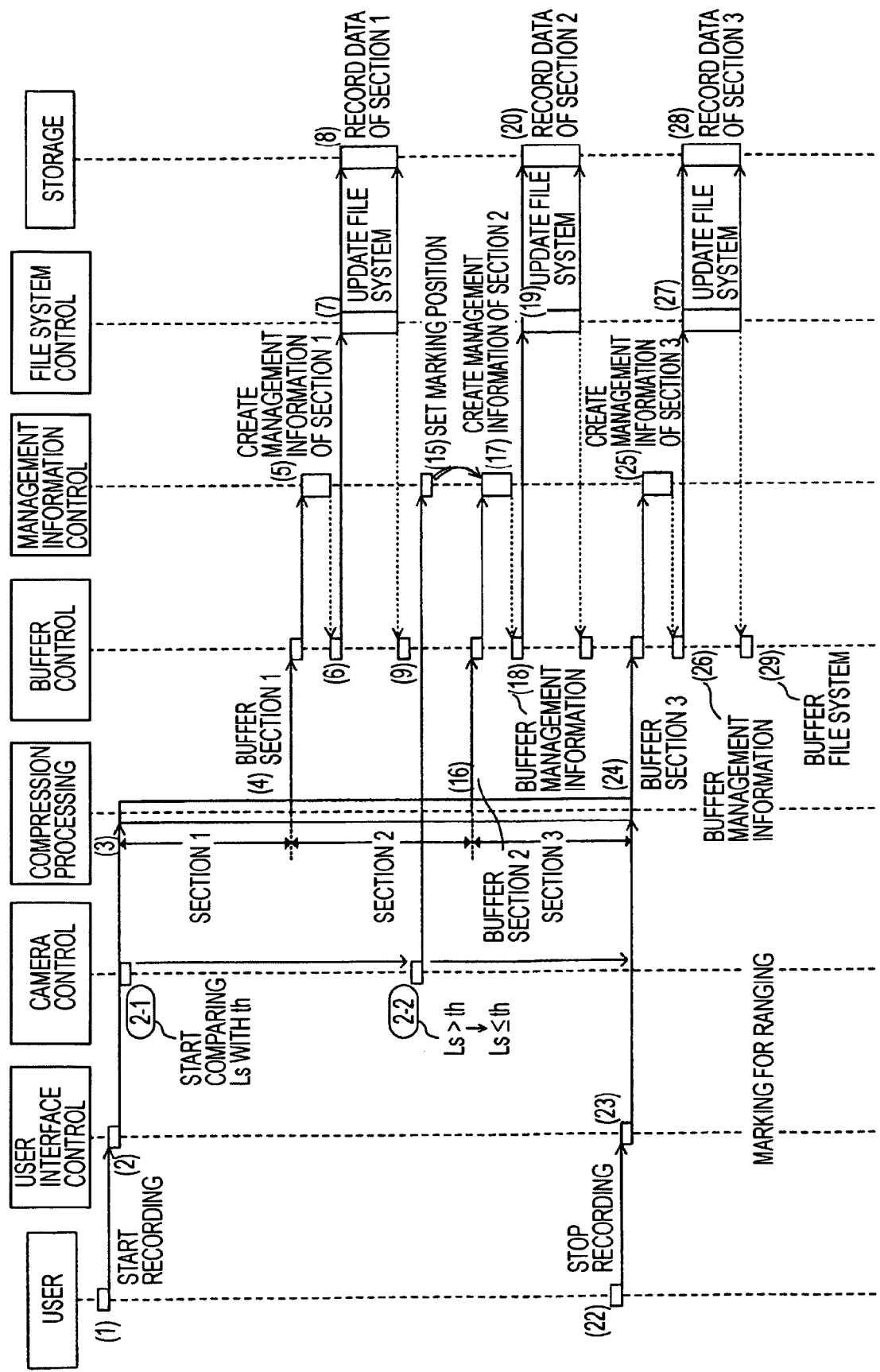
FIG. 7 is a diagram showing an example of operations, including a marking process according to a distance to a subject, of a system of an image capturing apparatus at the time of recording.

As a variation, a configuration for allowing the camera controlling section 18 to execute part of processing shown in FIG. 6 is also possible. FIG. 7 to be described next is based on this configuration.

FIG. 7 is executed by an image capturing apparatus between a start and a termination of recording of one piece of recording data, and is a specific example of a sequence of processing for recording the recording data including processing for marking according to a subject distance. This processing sequence will be described according to numerals indicating steps shown with ( ) in the drawing. The marking processing in this processing sequence employs the condition and the execution determination criterion shown in FIG. 6.

Since STEP 1 to STEP 6 are similar to STEP 1 to STEP 6 of FIG. 3 or FIG. 5, the description is omitted here.

In addition, writing of data of a section 1, an update of a file system, and buffering at STEP 7 to STEP 9 are also similar to those of FIG. 3 or FIG. 5.

However, in this drawing, STEP 2-1 and STEP 2-2 are shown as processing of the camera controlling section 18.

At STEP 2-1, processing for determining whether or not the marking condition is met utilizing information of a subject distance acquired for the purpose of the auto focus control is started in response to the user interface controlling section 22 receiving a recording start operation at STEP 2. That is, at STEP 2-1 and the following steps, the processing corresponding to FIG. 6 is started. The camera controlling section 18 of this case at least performs processing for acquisition of the subject distance Ls and for comparison of the subject distance Ls and the threshold th at STEPs S301 and S302.

Additionally, in this case, regarding the relationship between the subject distance Ls and the threshold th, Ls>th is maintained during a period after the start of STEP 2-1 until STEP 2-2. It is assumed that a negative result is obtained at STEP S302.

In this case, as shown in STEP 2-2, the relationship between the subject distance Ls and the threshold th is determined to have shifted from a state of Ls>th to Ls≤th at a timing that is in the course of compressing and encoding image captured/sound captured video/audio data of a section 2. That is, a positive determination result is obtained at STEP S302. In this case, the camera controlling section 18 notifies the management information controlling section 20 of this.

In this drawing, STEP 10 to STEP 14 are omitted due to the correspondence to FIG. 3 and FIG. 5 described above. STEP to be described next is STEP 15.

STEP 15: The management information controlling section 20 notified that the subject distance Ls and the threshold th has shifted from the state of Ls>th to Ls≤th at STEP S2-2 described above executes processing at STEP S303 and the following step of FIG. 6, for example. In this case, a positive determination result is obtained at STEP S304 and processing of STEP S305 is executed since the marking is not performed at the timing before STEP 2-2. That is, a position on the recording data corresponding to the present time Tpre is set as a marking position. This marking position resides within the recording data of the section 2.

Since STEP 16 to STEP 29 are similar to those of FIG. 3 or FIG. 5, the description is omitted here. Meanwhile, at the time of creation of management information for compressed and encoded data of the section 2 at STEP 17, the creation is performed so that the marking position set at STEP 15 is reflected as in the case of FIG. 5.

In the description given above, it is assumed that the camera controlling section 18 performs the comparison of the subject distance Ls and the threshold th at STEP S302 of FIG. 6. However, as described before, with the configuration of FIG. 1, the management information controlling section 20 may be configured to execute processing of STEP S302 utilizing the subject distance Ls received from the camera controlling section 18. In either case, such comparison processing can be realized as software processing by a CPU of a microcomputer actually provided in the image capturing apparatus.

Subsequently, a configuration for performing marking according to a change in a predetermined feature value regarding an input signal (a video signal or an audio signal) obtained by image capturing or sound capturing will be described.

As illustrated above, some features of an input signal can be considered. Here, particularly skin colors of colors of images displayed on the basis of a video signal is detected as a feature value. As a condition for detecting skin colors, a condition that "a time point at which a ratio (a skin color occupancy ratio α) of skin color detected blocks in a specific area set as a skin color detection area in an image area for one frame has shifted from a value smaller than a threshold th(h) (α<th(h)) to a value equal to or greater than the threshold th(h) (α≥th(h)) is set as a marking timing" is set. Satisfying the above-described condition can be considered as a state where a human figure is included in an image area potion serving as the skin color detection area as a subject. Accordingly, the above-mentioned threshold th(h) is set in consideration of this.

In addition, an execution determination criterion that "the marking is not performed unless a set marking timing is after one minute or more from the last marking position" is also included.

Image capturing apparatuses that implement such a skin color detecting function have been already known. A result of the skin color detection is used in the camera control or the like. For example, techniques for performing auto focus control using this area as a target while considering an image area in which skin colors are detected as an area showing a subject of a human figure have been known.

Figure 8:
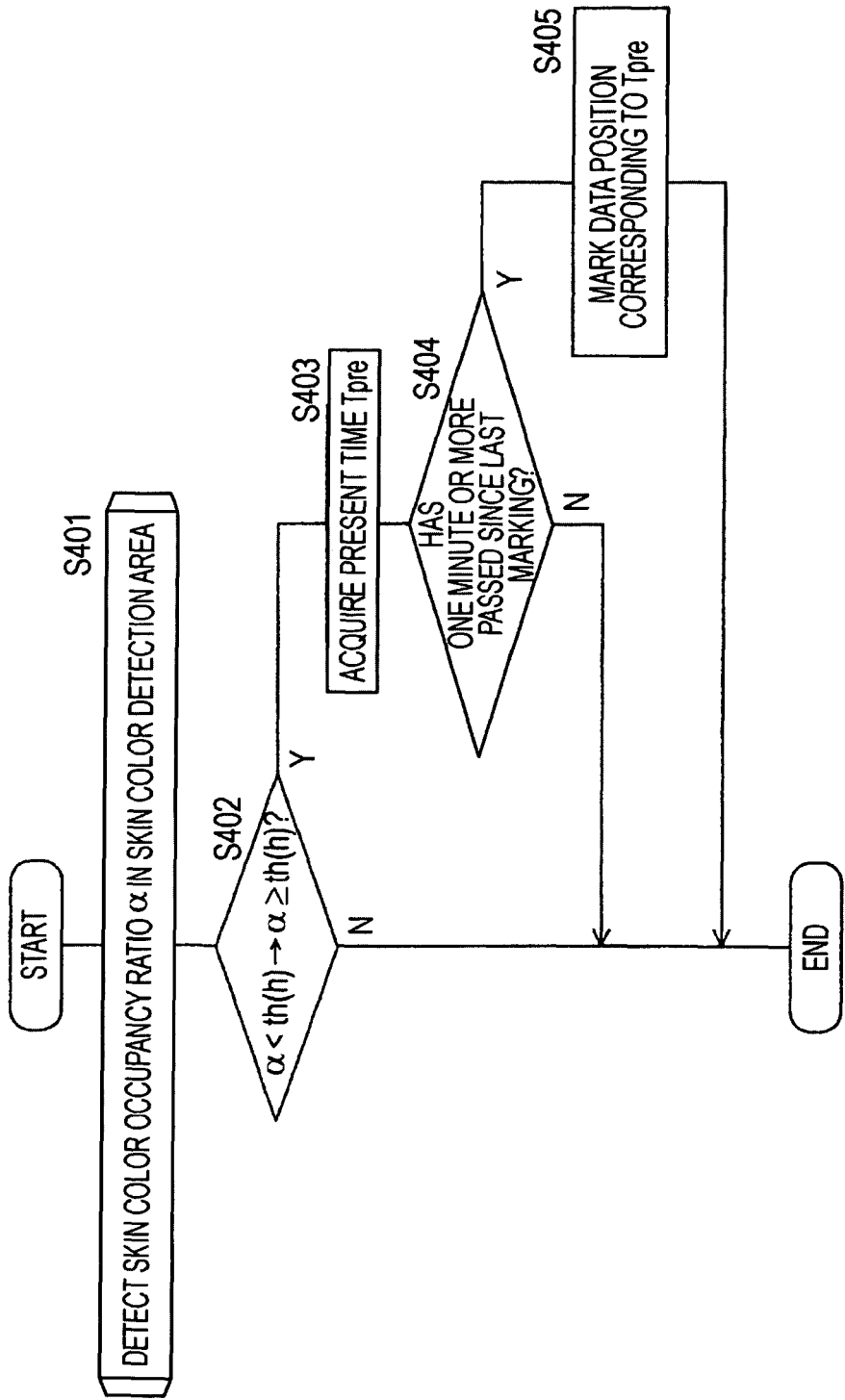
FIG. 8 is a flowchart showing an example of a procedure of a marking process according to a skin color detection result (a feature value of a video signal).

A flowchart of FIG. 8 shows an example of a procedure for executing marking according to a result of detecting the skin color occupancy ratio as a feature value of an input signal.

The processing shown in this FIG. 8 is realized by the video controlling section 23 (the video compression processing section 12) and the management information controlling section 20 working in cooperation. For example, at least processing of STEP S401 from the processing of FIG. 8 is processing that is executable by the video controlling section 23 sampling video signal data that is undergoing compression and encoding processing in the video compression processing section 12.

At STEP S401, processing for detecting a skin color occupancy ratio α, which is a ratio of areas where skin colors are actually detected in a skin color detection area set as a partial area of an image area for one frame, is executed as the skin color detection processing. A concept that serves as an assumption of this processing will be described using FIG. 10A and FIG. 10B.

Figure 10A:
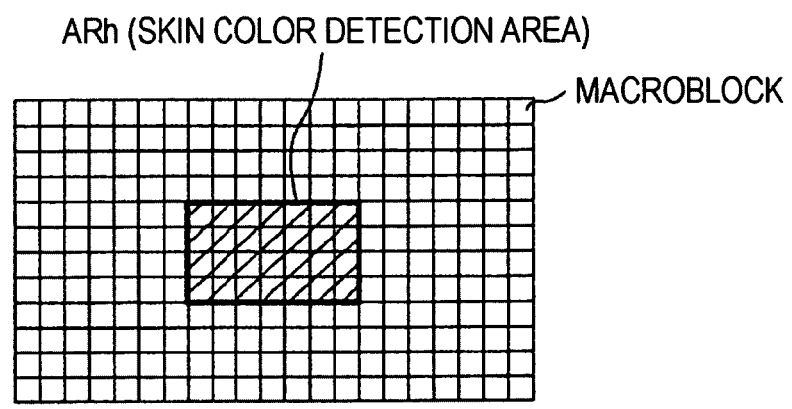
FIG. 10A is a diagram for illustrating a concept and a method of skin color detection.

FIG. 10A shows an image area for one frame as a matrix of units of macroblocks. As is known, the macroblocks are a collective unit of Y, Cr, and Cb constituted by a predetermined number of samples (pixels) formed in the course of compressing and encoding digital video signals, such as the MPEG method. A partial area constituted by a group of macroblocks at a predetermined position of the image area that is formed in this manner is set as a skin color detection area ARh. In this drawing, the skin color detection area ARh is formed by a group of square macroblocks.

In addition, in this case, the skin color detection area ARh is set to be located at a substantially center part of the image area for one frame. Detection of skin colors is to detect a subject of a human figure (particularly, a part of a face) by the color. When a human figure is set as a subject, an image is often captured so that the subject is located substantially at the center as a composition. Accordingly, the skin color detection area ARh is set at the substantially center part of the image area for one frame. The setting of the skin color detection area ARh in the image area for one frame described here is only an example. For example, the skin color detection area ARh may be set at a position suitably shifted from the center part.

Figure 10B:
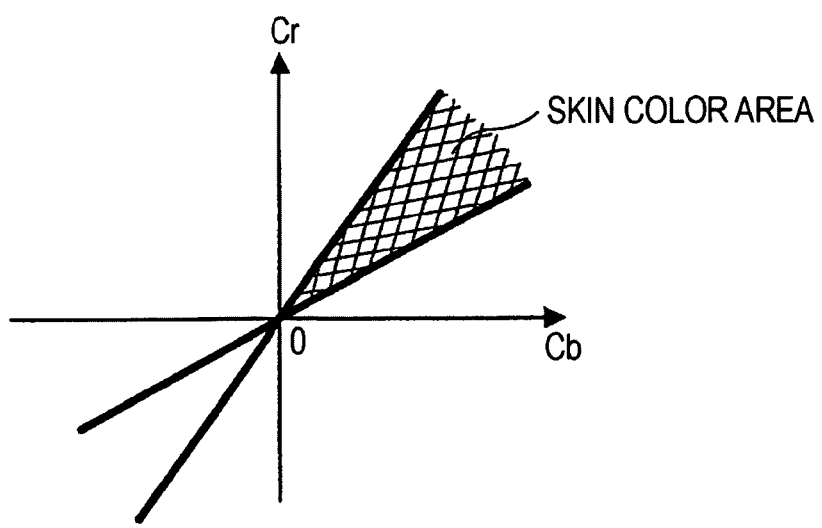
FIG. 10B is a diagram showing a concept and a method of skin color detection.

In addition, for example, whether or not a color of a pixel is a skin color can be determined on the basis of a relationship of each value of color difference signals Cr and Cb among the luminance signal (Y) and the color difference signals (Cr, Cb). For example, as shown in FIG. 10B, coordinate axes of Cr and Cb are considered as the X and Y axes and an area on coordinates constituted by a predetermined range of coordinates (Cr, Cb) is conceptually treated as skin colors.

Figure 9:
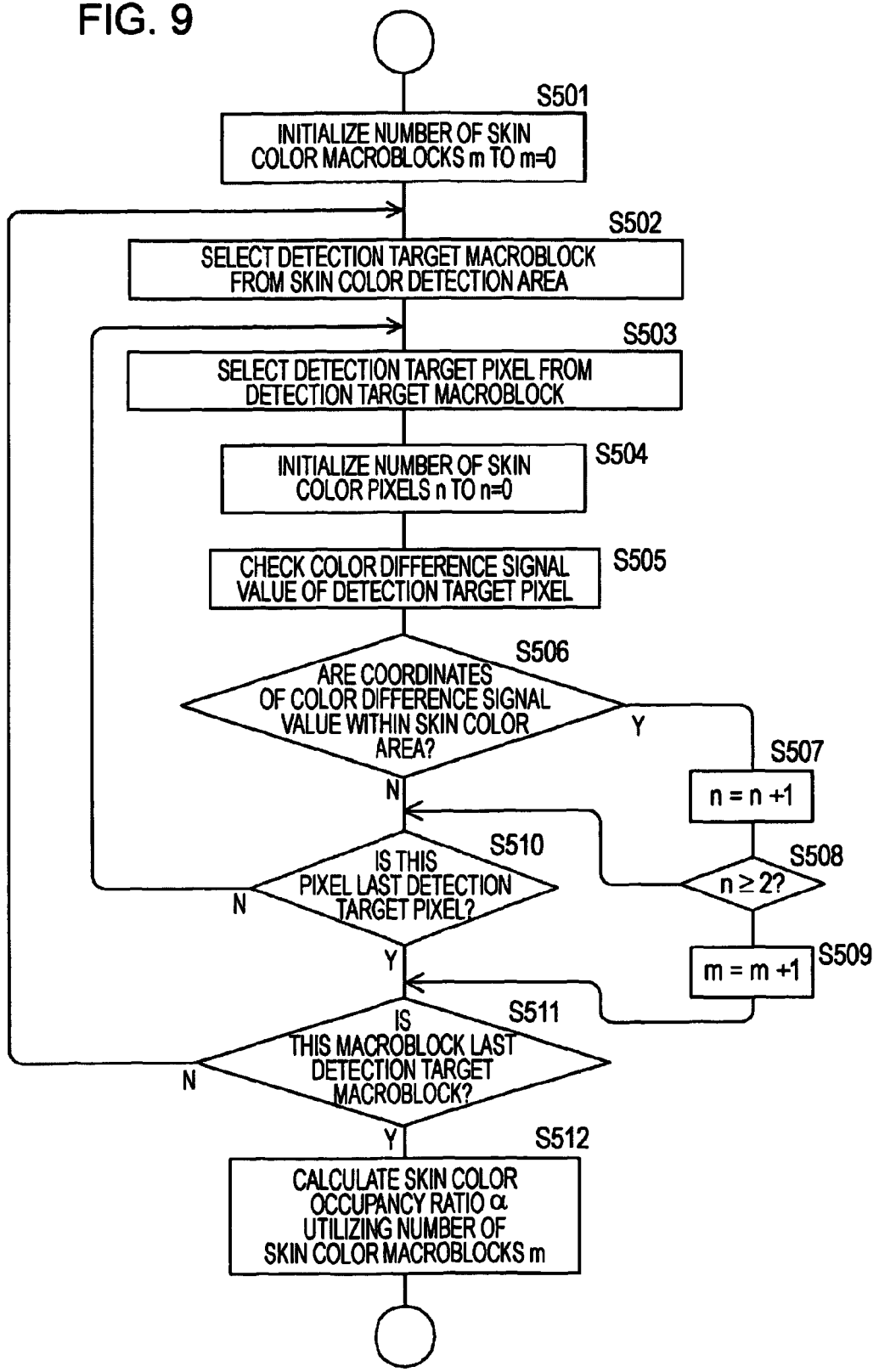
FIG. 9 is a flowchart showing an example of a procedure for detecting a skin color occupancy ratio.

The processing for skin color detection of STEP S401 of FIG. 8 corresponds to that shown in a flowchart of FIG. 9, for example.

In this drawing, firstly, a variable m that indicates the number of macroblocks treated as skin colors (skin color macroblocks) is initialized to m=0 at STEP S501.

At the next STEP S502, one detection target macroblock serving as a target of skin color detection is selected from the skin color detection area ARh, and the process processes to at STEP S503 and the following steps.

At STEP S503, one detection target pixel is selected from the detection target macroblock. At the next STEP S504, a variable n that indicates the number of pixels treated as skin colors (skin color pixels) is initialized to n=0.

At STEP S505, each value of the color difference signal Cb or Cr of the detection-target pixel selected at the preceding STEP S503 is recognized. At the next STEP S506, whether or not coordinates (Cb, Cr) of this recognized color difference signals Cb and Cr reside within the skin color area shown in, for example, FIG. 10B is determined. That is, determination regarding whether or not the detection target pixel selected at STEP S503 is the skin color pixel is performed.

If a negative determination result that the coordinates (Cb, Cr) do not reside within the skin color area, i.e., the detection target pixel is not the skin color pixel, is obtained at STEP S506, STEPs after STEP S507 to be described later are skipped, and the process proceeds to STEP S510.

On the other hand, if a positive determination result that the coordinates (Cb, Cr) reside within the skin color area, i.e., the detection target pixel is the skin color pixel, is obtained at STEP S506, the process proceeds to STEP S507. The variable n indicating the number of skin color pixels is incremented to n=n+1, and the process proceeds to STEP S508.

At STEP S508, whether or not the current variable n is equal to or greater than 2 is determined. In this case, if two or more pixels are skin color pixels among all of pixels forming the macroblock, the macroblock can be considered as a skin color macroblock. By determining whether or not the current variable n is equal to or greater than 2 at STEP S508, whether or not the currently selected check target macroblock is a skin color macroblock is determined.

If a positive determination result is obtained at STEP S508, the process proceeds to STEP S509. At STEP S509, the variable m that indicates the number of skin color macroblocks is incremented to m=m+1, and the process proceeds to STEP S511.

On the other hand, if a negative determination result is obtained at STEP S508, the process proceeds to STEP S510.

At STEP S510, whether or not the currently selected detection target pixel is the last selected detection target pixel in the currently selected detection target macroblock is determined. If a negative determination result is obtained here, the process returns to STEP S503 to perform skin color detection regarding the next detection target pixel.

On the contrary, if a positive result is obtained at STEP S510, the process proceeds to STEP S511.

At STEP S511, whether or not the currently selected detection target macroblock is the last selected macroblock among all of macroblocks in the skin color detection area ARh is determined. If a negative determination result is obtained here, the process returns to STEP S502 to perform skin color detection regarding the rest of the macroblocks. On the contrary, if a positive determination result is obtained at STEP S511, the process proceeds to STEP S512.

At the stage of STEP S512, the number of macroblocks detected as skin color macroblocks (the number of skin color macroblocks m) is established as a result of performing the skin color detection regarding all of macroblocks in the skin color detection area ARh.

Accordingly, at STEP S512, the skin color occupancy ratio α is determined utilizing the number of skin color macroblocks m. As the simplest example, the skin color occupancy ratio α can be calculated through a calculation of α=m/M, where the number of all of macroblocks forming the skin color detection area ARh is M.

The description returns to FIG. 8.

After detecting the skin color occupancy ratio α through the procedure of the above-described FIG. 9 as STEP S401, the process proceeds to STEP S402.

The processing of STEP S402 may be executed by the video controlling section 23 or may be executed by the management information controlling section 20. However, the description is given here while assuming the video controlling section 23 executes the processing. The video controlling section 23 determines whether or not a state has shifted from a state where the skin color occupancy ratio α is lower than the threshold th(h) (α<th(h)) to a state where the skin color occupancy ratio α is equal to or higher than the threshold th(h) (αth(h)) as a result of comparing the skin color occupancy ratio α detected at the above-described STEP S401 and a predetermined threshold th. As described above, a fact that the state has shifted from the state where the skin color occupancy ratio α is lower than the threshold th(h) to the state where the skin color occupancy ratio α is equal to or higher than the threshold th(h) means that a change, which is that a subject of a human figure is included in the image area corresponding to the skin color detection area ARh, has occurred.

If a negative determination result is obtained at STEP S402, the processing shown in this drawing is terminated. If a positive determination result is obtained, the process proceeds to STEP S403.

The processing at STEP S403 and the following steps is processing executed by the management information controlling section 20 in response to the obtainment of the positive determination result at STEP S402. At STEP S403, the present time Tpre is acquired. At the next STEP S404, whether or not a predetermined time (one minute) or more has passed from the final (last) marking position to the time for this marking position is determined. If a negative determination result is obtained, this processing is terminated. If a positive determination result is obtained, the process proceeds to STEP S405. A position on the recording data corresponding to the present time Tpre acquired at STEP S303 is set as a sectioning position (a marking position).

Figure 11:
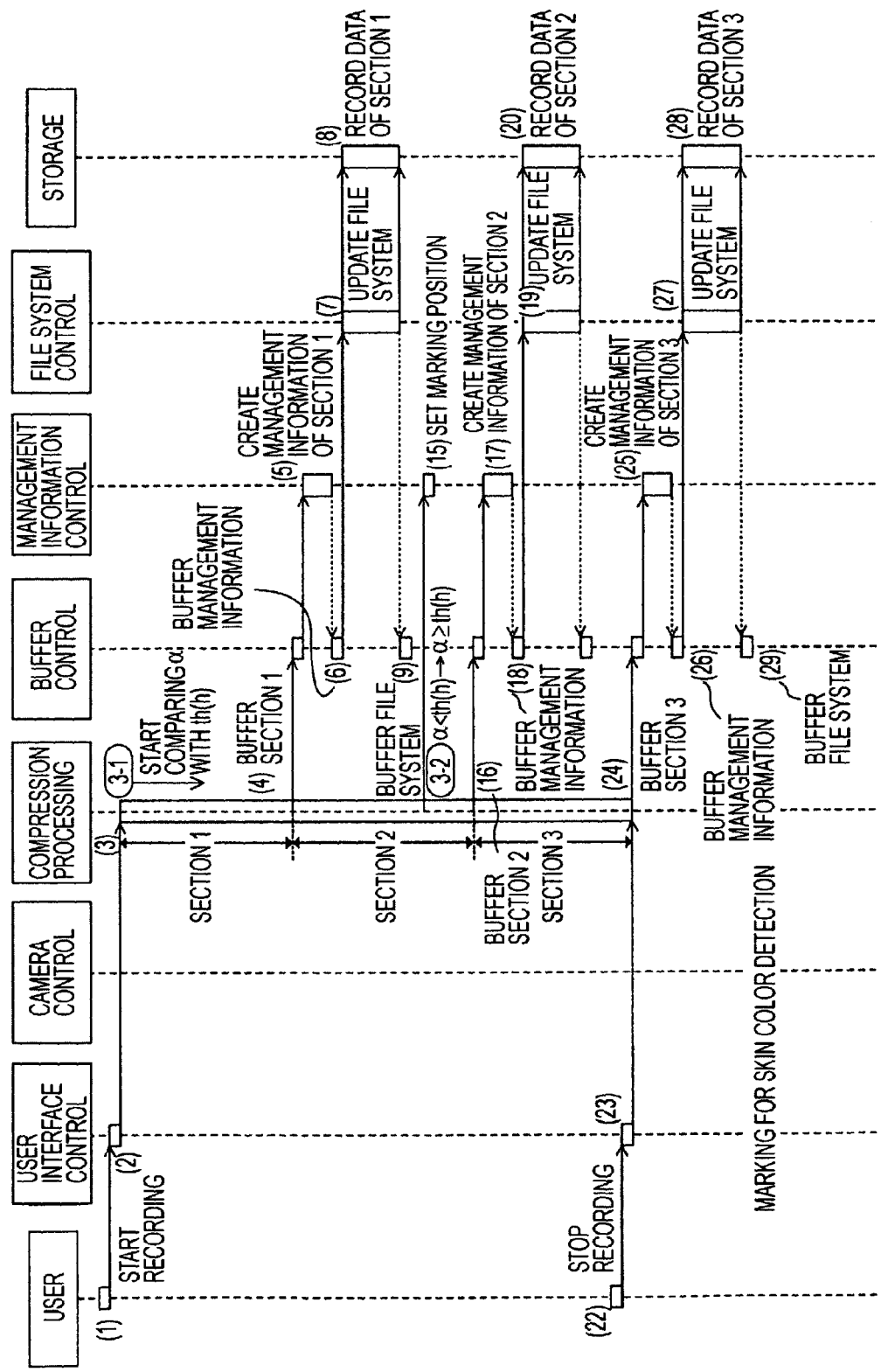
FIG. 11 is a diagram showing an example of operations, including a marking process according to a skin color detection result, of a system of an image capturing apparatus at the time of recording.

FIG. 11 is executed by an image capturing apparatus between a start and a termination of the recording of one piece of recording data and is a specific example of a sequence of processing for recording the recording data including processing for marking according to the skin color detection result. This processing sequence will be described according to numerals indicating steps shown with ( ) in the drawing. The marking processing in this processing sequence employs the condition and the execution determination criterion shown in FIG. 8.

Since STEP 1 to STEP 6 are similar to STEP 1 to STEP 6 of FIG. 3, FIG. 5, or FIG. 7, the description is omitted here.

In addition, writing of data of a section 1, an update of a file system, and buffering at STEP 7 to STEP 9 are also similar to those of FIG. 3, FIG. 5, or FIG. 7.

However, in this drawing, STEP 3-1 and STEP 3-2 are shown as processing of the video compression processing section 12.

At STEP 3-1, processing for comparing the skin color occupancy ratio α and the threshold th(h) is started in response to the user interface controlling section 22 receiving a recording start operation at STEP 2. That is, execution of processing shown at STEPs S401 and S402 of FIG. 8 is started.

Additionally, in this case, regarding the relationship between the skin color occupancy ratio α and the threshold th, α<th(h) is maintained during a period after the start of STEP 3-1 until STEP 3-2. It is assumed that a negative result is obtained at STEP S402.

In this case, as shown in STEP 3-2, the relationship between the skin color occupancy ratio α and the threshold th(h) is determined to have shifted from the state of α<th(h) to α th(h) at a timing that is in the course of compressing and encoding image captured/sound captured video/audio data of a section 2. That is, a positive determination result is obtained at STEP S302. The video controlling section 23 for controlling video compression processing notifies the management information controlling section 20 of this.

In this drawing, STEP 10 to STEP 14 are omitted due to the correspondence to FIG. 3 and FIG. 5 described above as in the case of FIG. 7. STEP to be described next is STEP 15.

STEP 15: The management information controlling section 20 notified at STEP 3-2 described above executes processing at STEP S403 and the following step of FIG. 8, for example. In this case, a positive determination result is obtained at STEP S404 and processing of STEP S405 is executed since the marking is not performed at the timing before STEP 3-2. That is, a position on the recording data corresponding to the present time Tpre is set as a marking position. This marking position also resides within the recording data of the section 2.

Since STEP 16 to STEP 29 are similar to those of FIG. 3, FIG. 5, or FIG. 7, the description is omitted here. Meanwhile, at the time of creation of management information corresponding to the compressed and encoded data of the section 2 at STEP 17, the creation is performed so that the marking position set at STEP 15 is reflected as in the case of FIG. 5 and FIG. 7.

The management information controlling section 20 may be configured to execute processing for comparing the skin color occupancy ratio α and the threshold th(h) at STEP S402 of FIG. 8 after receiving the skin color occupancy ratio α from the camera controlling section 18.

Subsequently, a configuration for performing marking according to a change in a position of an image capturing apparatus will be described.

In this case, a condition that "a time point a which a predetermined time has passed from a time point at which a distance between a predetermined reference position and the present position becomes equal to and greater than a predetermined value is set as a marking timing" is set. In addition, an execution determination criterion that "marking is not performed unless one minute or more has passed from the last marking position to the set marking timing" is included.

Figure 12:
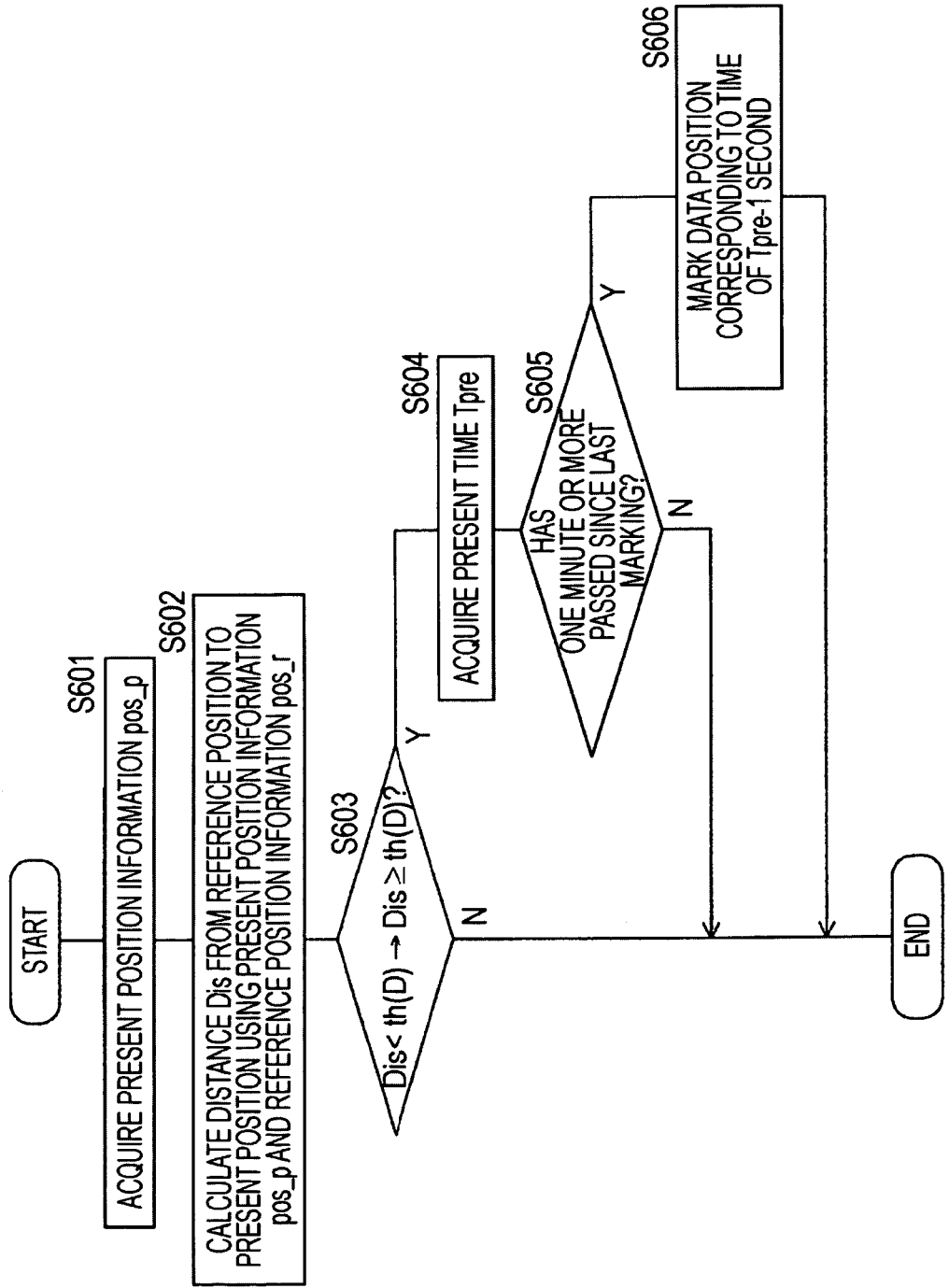
FIG. 12 is a flowchart showing an example of a procedure of a marking process in response to a change in position of an image capturing apparatus.

A flowchart of FIG. 12 shows an example of a procedure for executing marking according to a change in position of an image capturing apparatus.

The management information controlling section 20 is configured to start processing from STEP S601 at predetermined intervals. As processing of STEP S601, present position information pos_p detected by the position detecting section 24 is received through the camera controlling section

18. That is, the reception of the present position information pos_p is performed at predetermined intervals. At STEP S602, a distance Dis between a reference position and the present position is calculated using the present position information pos_p received at the above-described STEP S601 and reference position information pos_r indicating the reference position.

Meanwhile, for example, setting of a position for a time of a start of recording as the reference position is possible. The reference position information pos_r of this case can be obtained on the basis of the position information detected at the time of the start of the recording.

Alternatively, a user may specify the reference position beforehand. For example, in response to a user, carrying the image capturing apparatus, performing an operation for setting the reference position, the position information detected at that time is set as the reference position information pos_r. In addition, the image capturing apparatus is configured to output map information and a configuration for setting a location specified on this map information, a location corresponding a name of a place or a name of a station as the reference position information pos_r is also possible.

At STEP S603, whether or not a state has shifted from a state of Dis<th(D) to a state of Dis th(D) is determined regarding the distance Dis between the reference position and the present position calculated at the above-described STEP S602 and a threshold th(D) corresponding to a previously set predetermined distance. That is, "whether or not the distance between the predetermined reference position and the present position has shifted from the state where the distance is smaller than the predetermined value to the state where the distance is equal to or greater than the predetermined value" is determined. If a negative determination result that such a change is not observed is obtained at STEP S603, the processing shown in this drawing is terminated without performing the marking. If a positive determination result is obtained, the process proceeds to STEP S604.

At STEP S604, the present time Tpre is acquired.

At the next STEP S605, whether or not a predetermined time (one minute) or more has passed since the final (last) marking to the time for this marking position is determined. If a negative determination result is obtained, the processing is terminated without performing the marking. On the contrary, if a positive determination result that one minute or more has passed is obtained, the process proceeds to STEP S606.

At STEP S606, a position on the recording data corresponding to Tpre−1 second is set as a sectioning position (a marking position).

Figure 13:
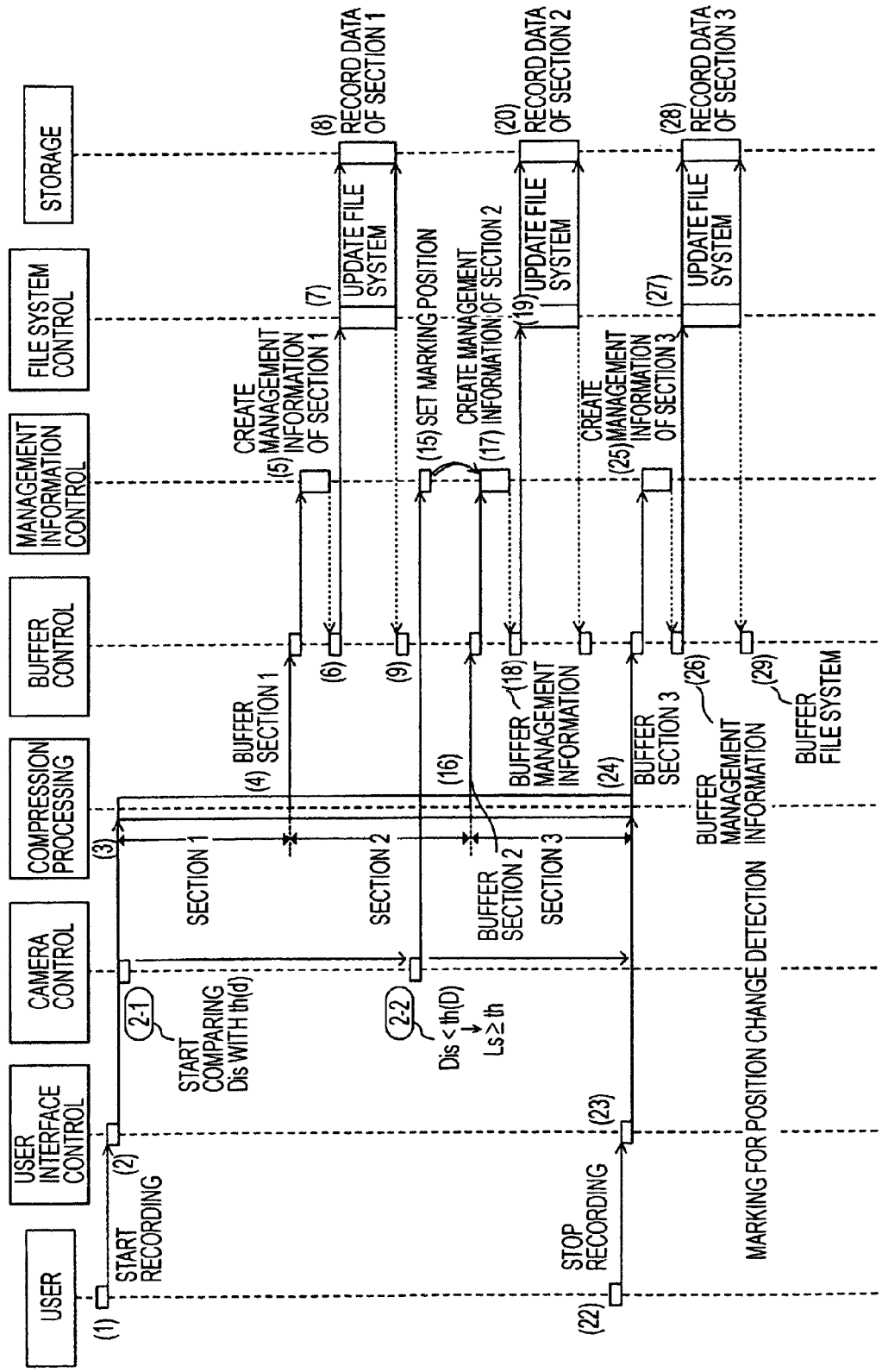
FIG. 13 is a diagram showing an example of operations, including a marking process in response to a change in position of an image capturing apparatus, of a system of an image capturing apparatus at the time of recording.

Meanwhile, a configuration for allowing the camera controlling section 18 to perform part of processing shown in the above-described FIG. 11 is also possible. FIG. 13 to be described next is based on this configuration.

FIG. 13 is executed by an image capturing apparatus between a start and a termination of recording of one piece of recording data and is a specific example of a sequence of processing for recording the recording data including processing for marking according to a position change of the image capturing apparatus. This processing sequence will be described according to numerals indicating steps shown with ( ) in the drawing. The marking processing in this processing sequence employs the condition and the execution determination criterion shown in FIG. 11.

Since STEP 1 to STEP 6 are similar to STEP 1 to STEP 6 of FIG. 3, FIG. 5, or FIG. 7, the description is omitted here.

In addition, writing of data of a section 1, an update of a file system, and buffering at STEP 7 to STEP 9 are also similar to those of FIG. 3, FIG. 5, FIG. 7.

However, in this drawing, STEP 2-1 and STEP 2-2 are shown as processing of the camera controlling section 18.

At STEP 2-1, processing for determining whether or not the marking condition are met utilizing the present position information received from the position detecting section 24 at predetermined intervals is started in response to the user interface controlling section 22 receiving a recording start operation at STEP 2. That is, at STEP 2-1 and the following steps, the processing corresponding to FIG. 12 is started. The camera controlling section 18 of this case at least performs processing for acquisition of the present position information pos_p, for calculation of the distance Dis, and for comparison of the present position information pos_p and the distance Dis at STEPs S601 to S603, for example.

Additionally, in this case, regarding the relationship between the present position information pos_p and the distance Dis, Dis<th(D) is maintained during a period after the start of STEP 2-1 until STEP 2-2. It is assumed that a negative result is obtained at STEP S603.

In this case, as shown in STEP 2-2, the relationship between the present position information pos_p and the distance Dis is determined to have shifted from the state of Dis<th(D) to a state of Dis th(D) at a timing that is in the course of compressing and encoding image captured/sound captured video/audio data of a section 2. That is, a positive determination result is obtained at STEP S603. In this case, the camera controlling section 18 notifies the management information controlling section 20 of this.

In this drawing, STEP 10 to STEP 14 are omitted due to the correspondence to FIG. 3 and FIG. 5 as in the case of FIG. 7. STEP to be described next is STEP 15.

STEP 15: The management information controlling section 20 notified that the relationship between the present position information Pos_p and the distance Dis has shifted from the state of Dis<th(D) to Dis th(D) at STEP 2-2 described above executes processing at STEP S604 and the following step of FIG. 12. In this case, a positive determination result is obtained at STEP S605 and processing of STEP S606 is executed since the marking is not performed at the timing before STEP 2-2. That is, a position on the recording data corresponding to the present time Tpre is set as a marking position. This marking position resides within the recording data of the section 2.

Since STEP 16 to STEP 29 are similar to those of FIG. 3, FIG. 5, or FIG. 7, the description is omitted here. Meanwhile, at the time of creation of management information corresponding to the compressed and encoded data of the section 2 at STEP 17, the creation is performed so that the marking position set at STEP 15 is reflected as in the case of FIG. 5.

Also in this case, it is assumed that the camera controlling section 18 performs comparison of the present position information pos_p and the distance Dis at STEP S603 of FIG. 12 in the description given above. However, as described above, with the configuration of FIG. 1, the management information controlling section 20 may configured to execute the processing of STEP S603 utilizing the present position information pos_P received from the camera controlling section 18.

Example manners of storing information of marking positions set in the above-described manner in the management information will be cited here.

Here, a case where the recording medium is a DVD (Digital Versatile Disc) is cited as an example. As is known, DVD-VR (Video Recording) and DVD-Video are widely known as logical data formats of DVD.

In the case of DVD-VR, it is possible to store information of marking positions utilizing a structure of RTR_VMG→UD_PGCI→CI→M_CI→M_C_EPI. In this case, according to the DVD-VR format, the information of the marking positions can be set at an accuracy of frame. A time for one frame is 1/30 second in the NTSC system and 1/25 second in the PAL system.

Additionally, in the case of DVD-Video, the information of marking positions can be stored utilizing a structure of

VTSI→VTS_PGCIT→VTS_PGCI→C_PBIT→C_PBI.

Subsequently, utilization examples of marking positions set regarding recording data in the above-described manner will be described.

Figure 14:
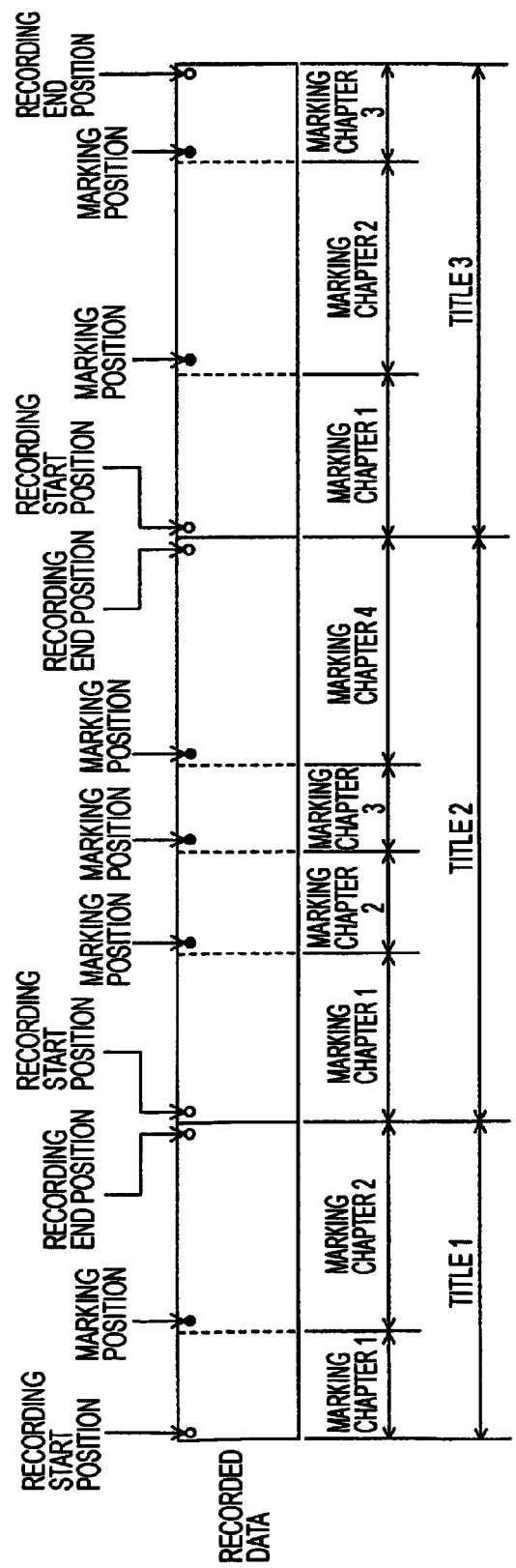
FIG. 14 is diagram schematically showing an example of a recorded content of recording data including results of setting marking positions.

As shown in FIG. 14, suppose that three titles are recorded as examples of recorded contents of recording data recorded on, for example, the storage section 17. Here, the recording data of a unit of title has the content from a recording start operation to a recording stop operation. Firstly, each title is managed so that a recording start position and a recording end position are specified by management information.

On that basis, in this case, one marking position is set between a start and a termination of the recording regarding recording data of a title 1. Accordingly, recording data of the title 1 can be managed while assuming that the recording data is divided into a recording data portion from the recording start position to a data position immediately before the marking position and a recording data portion from the marking position to the recording end position by this one marking position. The recording data portions divided in this manner is handled as marking chanters, and serial numbers from 1 are sequentially attached from the recording start position. Accordingly, the recording data of the title 1 can be considered to be constituted by marking chapters 1 and 2. In addition, since three marking positions are set regarding recording data of a title 2, the recording data of the title 2 are divided into four marking chapters of marking chapters 1, 2, 3, and 4. Additionally, since two marking positions are set regarding recording data of a title 3, the recording data of the title 3 is divided into three marking chapters of marking chapters 1, 2, and 3.

For the confirmation, the information of marking positions of each title is also stored in management information as in the case of the recording start position and the recording end position in this embodiment.

In this embodiment, utilization of marking chapters of each tile, which is divided by marking positions in this manner, in the following manner is possible.

One is to allow forwarding and rewinding of the recording data in a unit of this marking chapter regarding a jump to a playback position during playback.

Another is to allow a content of recording data recorded on a recording medium to be presented in a unit of this marking chapter when the content is presented through displaying.

Figure 15A:
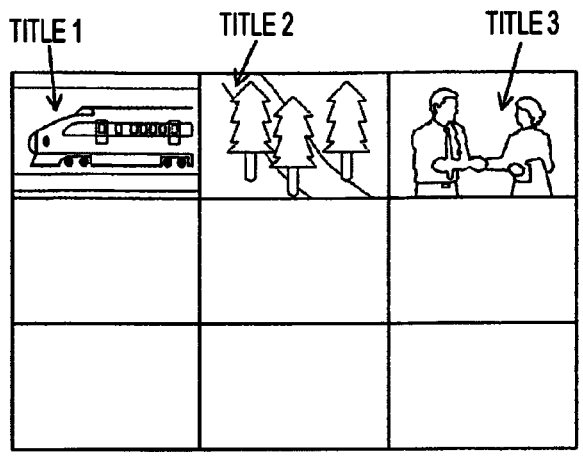
FIG. 15A is a diagram showing an example of a manner of displaying a recorded content according to the recorded content of FIG. 14.
Figure 15B:
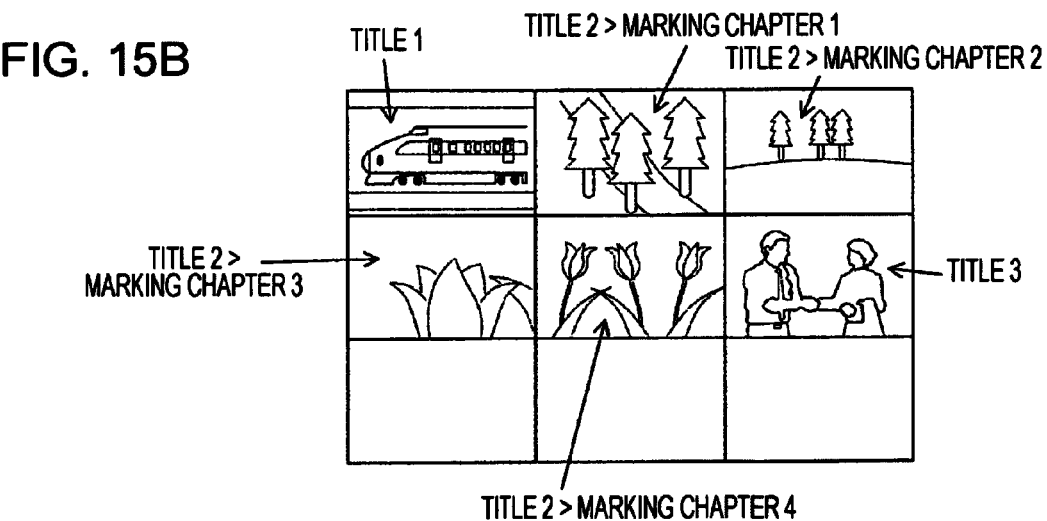
FIG. 15B is a diagram showing an example of a manner of displaying a recorded content according to the recorded content of FIG. 14.
Figure 15C:
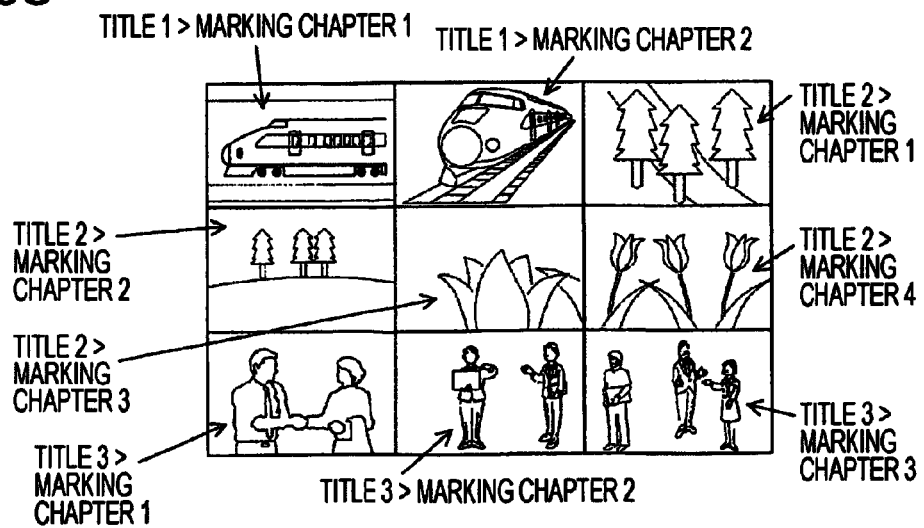
FIG. 15C is a diagram showing an example of a manner of displaying a recorded content according to the recorded content of FIG. 14.

FIG. 15A to FIG. 15C show display examples of index screens representing the content recorded on a recording medium through displaying. Meanwhile, the display of the index screens shown in this drawing corresponds to the recorded content shown in FIG. 14.

Firstly, FIG. 15A shows a display example of a basic index screen corresponding to the recorded content shown in FIG. 14. As this basic index display, thumbnail images corresponding to titles are arranged and displayed in an order of playback as shown in the drawing. Since three titles of the titles 1, 2, and 3 are recorded as the recorded content of FIG. 14, a thumbnail image of each title is arranged and displayed in an order of the title 1→the title 2→the title 3 in FIG. 15A.

Suppose that an operation for selecting the title 2 to expand the title to chapters is performed in this state. In response to this, the display of the recorded content changes from the manner shown in FIG. 15A to the manner shown in FIG. 15B.

More specifically, in FIG. 15B, thumbnail display is performed in a unit of marking chapters regarding the title 2. As a whole, thumbnail images are displayed in an order of the title 1→the title 2>the marking chapter 1→the title 2>the marking chapter 2→the title 2>the marking chapter 3→the title 2>the marking chapter 4→the title 3.

FIG. 15C shows a display state where thumbnail display is arranged in a unit of marking chapters also regarding the title 1 and the title 3 in a manner similar to the above-described one. In this case, as a whole, thumbnail images are displayed in an order of the title 1>the marking chapter 1→the title 1>the marking chapter 2→the title 2>the marking chapter 1→the title 2>the marking chapter 2→the title 2>the marking chapter 3→the title 2>the marking chapter 4→the title 3>the marking chapter 1→the title 3>the marking chapter 2→the title 3>the marking chapter 3.

For example, a configuration for performing index display only in a unit of marking chapter without employing a hierarchical concept of a title>a marking chapter such as this embodiment is also possible (In this case, the display shown in FIG. 15C is the basis display). However, since the distinction between a start position of a title and marking positions becomes clear by displaying the recorded content so that the above-described hierarchical concept is reflected as shown in FIG. 15A to FIG. 15C, the index screen is easily viewable for users and retrieval of recording data becomes easier.

Depending on an operation for such index display, it is possible to start playback of recording data not only from the top of a title but also from the top of a chapter. If a predetermined operation for starting playback by specifying, for example, one of the marking chapters of the title 2 shown in FIG. 15B or a desired thumbnail image from the marking chapters of each title shown in FIG. 15C, the apparatus operates to start playback of the recording data from the position of the marking chapter corresponding to the specified thumbnail image. Meanwhile, in the case of a state where thumbnail images of only titles are displayed as shown in FIG. 15A or in the case of performing an operation for starting playback by specifying a thumbnail image that is not expanded to the chapter level such as the title 1 and the title 3 in FIG. 15B, the playback of the recording data is started from the top position of the title.

Figure 16:
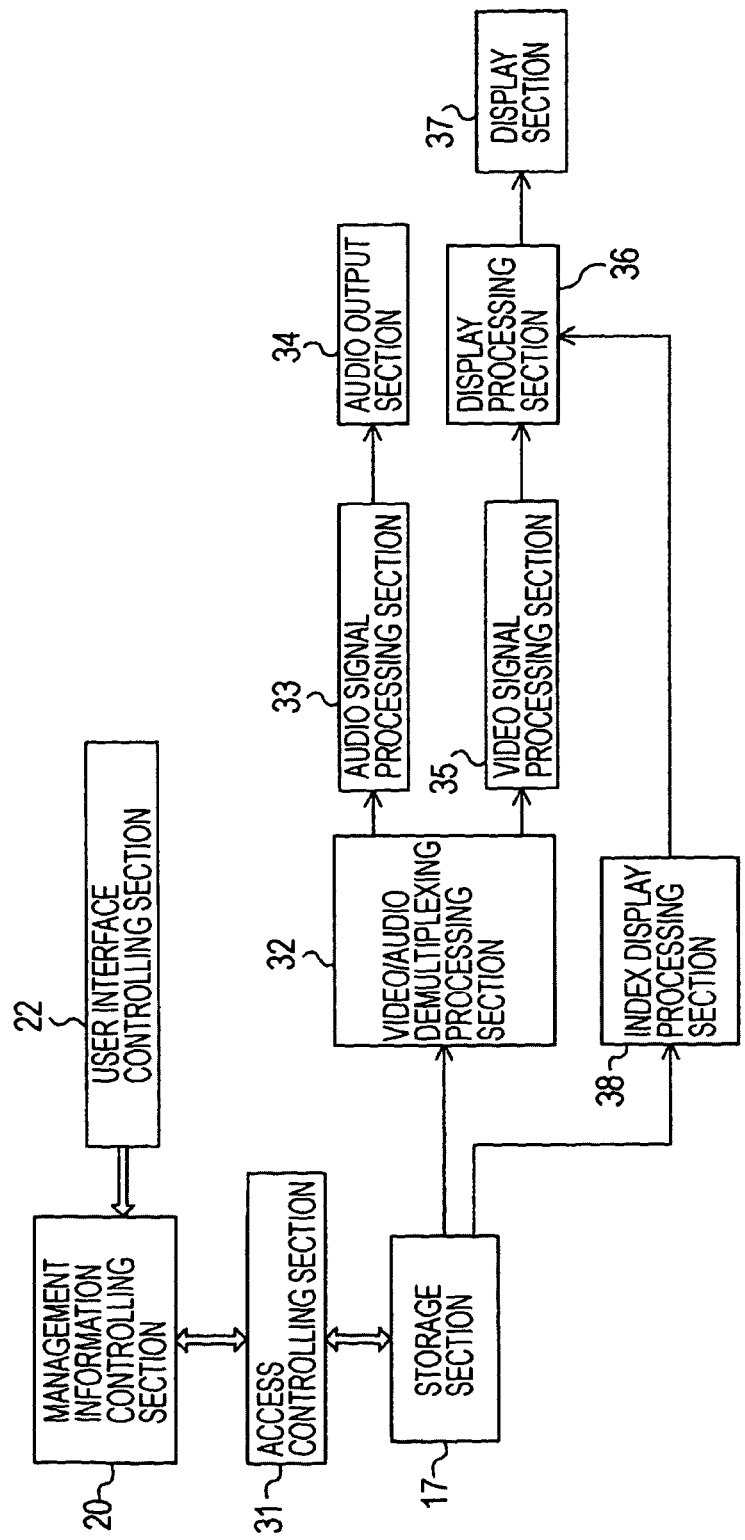
FIG. 16 is a diagram showing an example of a configuration of an image capturing apparatus of an embodiment supporting playback.

FIG. 16 shows a configuration of an image capturing apparatus of this embodiment supporting a function for playing back data recorded (stored) on the storage section 17. In this drawing, the same numerals are attached to sections that can be treated the same as those of FIG. 1.

Recording data and management information are recorded on the storage section 17 (a recording medium) of this case. In addition, the management information controlling section 20 of this case reads out the management information from the storage section 17 and holds the information therein, and is shown as a part for executing control of playback regarding the recording medium of the storage section 17. Since the management information controlling section 20 executes the control of reading out of data that is targeted at the storage section 17 at, for example, a logical level of a file system, the image capturing apparatus includes an access controlling section 31 between the management information controlling section 20 and the storage section 17 in order to realize physical access to the storage section 17 (a recording medium).

The user interface controlling section 22 of this case is shown as a part for transferring instructions and commands, corresponding to operations regarding execution of displaying of recorded content as shown in FIG. 15A to FIG. 15C and operations regarding playback of recording data, to the management information controlling section 20. The management information controlling section 20 executes access to the storage section 17 if necessary according to the instructions from the user interface controlling section 22.

The recording data read out from the storage section 17 according to the access control of the management information controlling section 20 is input to a video/audio demultiplexing processing section 32 at the time of typical playback. Video data and audio data recorded on the storage section 17 as the recording data is in a format that is multiplexed after having undergone compression and encoding. The video/audio demultiplexing processing section 32 demultiplexes the input recording data into the video data and the audio data, and outputs the video data to a video signal processing section 35 and the audio data to an audio signal processing section 33.

Compression and encoding processing has been performed on the video data and the audio data input to the video signal processing section 35 and the audio signal processing section 33. Accordingly, the video signal processing section 35 executes decoding processing for decompression on the input video data. In addition, the video signal processing section 35 performs predetermined signal on the decoded video data if necessary. Similarly, the audio signal processing section 33 executes decoding processing for decompression on the input audio data. The audio signal processing section 33 performs predetermined signal processing on the decoded audio data if necessary. Since the video data output from the video signal processing section 35 and the video data output from the audio signal processing section 33 are in a state where playback times are synchronized and so-called lip-sync is maintained.

The video data output from the video signal processing section 35 is output to a display processing section 36. The display processing section 36 executes control processing for the display driving on a display section 37 based on the input video data. This causes played back images of the video data to be displayed on the display section 37.

The audio data output from the audio signal processing section 33 is input to an audio output section 34. The audio output section 34 performs signal processing and amplification for outputting the input audio data from, for example, a speaker or the like as audio. In this manner, playback of images and audio of the recording data read out from the storage section 17 is performed. In addition, in images and audio output in this manner, the above-described lip-sync is maintained. This drawing shows a configuration for playing back and outputting images and audio of the recording data by a single image capturing apparatus. However, for example, analog or digital video signals and audio signals may be output to the outside from an image capturing apparatus and an external display apparatus and an audio output apparatus may output the images and audio.

In addition, an index display processing section 38 is provided for performing index display shown in, for example, FIG. 15A to FIG. 15C.

For example, if an operation for executing the index display is performed, the user interface controlling section notifies the management information controlling section of this. The management information controlling section recognizes the recorded content stored on the storage section 17 with reference to the management information having been read out from the storage section 17 and held therein. On the basis of this recognition result, the management information controlling section 20 reads out information necessary for the index displaying from the storage section 17 and transfers the information to the index display processing section 38. For example, image data that is sources of thumbnail images to be mapping-displayed on an index screen is read out from the recording data of the storage section 17, and the image data is transferred to the index display processing section 38. In the case of a logical format that thumbnail images are previously generated for each of starts of the titles and starts of the chapters and are recorded together with the recording data, the management information controlling section 20 has only to read out necessary thumbnail image data from the storage section 17 and transfer the data to the index display processing section 38.

The index display processing section 38 then generates image data of an index screen shown in FIG. 15A to FIG. 15C utilizing the transferred image data, and transfers the generated image data to the display processing section 36. This causes the index display to be performed on the display section 37.

For example, a display mode of showing recorded content in a unit of titles or marking chapters in a simpler manner only by using text information is also possible as the index display by the index display processing section 38.

Meanwhile, the present invention is not limited to the embodiments having been described.

Firstly, two or more states may be targeted and combined as states of an image capturing apparatus for setting marking positions. In the description given above, a zoom operation, a state of movement of an image capturing apparatus itself, a subject distance, and a feature value of an input signal are cited as the states of the image capturing apparatus. However, for example, a configuration of performing marking if one of the condition that the zoom operation is terminated and the condition that the subject distance becomes equal to or smaller than a predetermined value is met is also possible. In addition, a configuration for setting a marking execution determination criterion by employing the logical multiplication of conditions, such as the marking is performed if both of the condition that the zoom operation is terminated and the condition that the subject distance becomes equal to or smaller than a predetermined value are met, is also possible.

Regarding kinds of actual recording media (storage media) compliant with the storage section 17, optical disc recording media other than a DVD and an HDD that have been cited as examples and magnetic disc recording media can also be adopted. In addition, semiconductor storage devices, such as flash memories, can be also employed. In addition, the recording media, such as magnetic tapes, can be employed.

Additionally, in the embodiments, it is assumed that information indicating marking positions is stored in a logical area different from that for recording data and is included in a structure of management information for managing the recording data. However, the information may be recorded using a structure other than this. For example, regarding the marking position information, image data and audio data that can present a marking position to users may be superimposed on a video signal and an audio signal forming the recording data.

In addition, an image capturing apparatus according to the present invention is not limited to, for example, a portable video camera, and is applied to every kind of electronic devices having an image capturing function, such as, for example, mobile phones.

The invention claimed is:

1. An image capturing apparatus, comprising:
    an image pickup section configured to acquire a plurality of successive images through image capturing;
    a storage section configured to store the acquired images as moving image information; and
    a control section having a processor and configured to execute instructions to:
        detect a change in a predetermined state of the image capturing apparatus during acquisition of the images, the change in the predetermined state comprising a change in a spatial position of the image capturing apparatus;
        identify, in response to the detected change in the predetermined state, a first temporal position within the moving image information, the first temporal position corresponding to the detected change in the predetermined state;
        determine, within the moving image information, a second temporal position at which a magnitude of the change in spatial position exceeds a threshold value, the second temporal position corresponding to an effect of the detected change within the moving image information;
        determine whether a difference between the first and second temporal positions exceeds a threshold time period; and
        when difference exceeds the threshold time period, generate a signal to store information associated with the predetermined state at the second temporal position within the moving image information.

2. The image capturing apparatus of claim 1, wherein:
    the image pickup section comprises a view angle changing unit for changing an angle of view of an optical system for capturing the images; and
    the control section is further configured to detect, as the change in the predetermined state of the image capturing apparatus, an occurrence of a predetermined change in the angle of view.

3. The image capturing apparatus of claim 1, further comprising:
    a movement detecting section for detecting movement of the image capturing apparatus,
    wherein the control section is further configured to detect, as the change in the predetermined state of the image capturing apparatus, an occurrence of a predetermined movement of the apparatus.

4. The image capturing apparatus of claim 1, wherein:
    the image pickup section is further configured to determine information indicative of a distance between an apparatus and a subject that is utilized in an auto focus control operation; and
    the control section is further configured to detect, as the change in the predetermined state of the image capturing apparatus, an occurrence of a predetermined change in the distance.

5. The image capturing apparatus of claim 1, wherein the control section is further configured to detect, as the change in the predetermined state of the image capturing apparatus, an occurrence of a predetermined change in a feature value in the acquired images.

6. The image capturing apparatus of claim 1, comprising:
    a sound pickup section for detecting sound as audio information,
    wherein the control section is further configured to detect, as the change in the predetermined state of the image capturing apparatus, an occurrence of a predetermined change in a feature value in the audio information.

7. The image capturing apparatus of claim 1, comprising:
    a position detecting section for determining a position of the apparatus,
    wherein the change in spatial position corresponds to a displacement between the determined apparatus position and a reference position of the apparatus.

8. The image capturing apparatus of claim 7, wherein the control section is further configured to determine that the displacement between the determined and reference positions is equal to or greater than a threshold value, or is equal to or smaller than the threshold value.

9. The image capturing apparatus of claim 7, wherein the reference position corresponds to a prior position of the apparatus.

10. The image capturing apparatus of claim 7, wherein the reference position corresponds to a position of the apparatus specified through a specifying operation.

11. The image capturing apparatus of claim 1, wherein the second temporal position occurs at a predetermined time after the first temporal position.

12. The image capturing apparatus of claim 1, wherein the second temporal position occurs at a predetermined time before the first temporal position.

13. The image capturing apparatus of claim 1, further comprising:
    a display processing section configured to generate a signal to display at least a portion of the moving image information to a user, the displayed moving image information reflecting the predetermined state information at the second temporal position.

14. The image capturing apparatus of claim 1, further comprising:
    a display processing section configured to playback the moving image information from the second temporal position.

15. The apparatus of claim 1, wherein the control section is further configured to:
    receive information indicate of a current spatial position of the apparatus; and
    compute the change in spatial position of the apparatus based on the received information and at least one prior spatial position of the apparatus.

16. The apparatus of claim 1, wherein the change in the predetermined state of the apparatus further comprises a change in a complexity of the moving image information.

17. The apparatus of claim 16, wherein:
    the moving image information is compressed in accordance with a corresponding compression coefficient; and
    the control section is further configured to compute the complexity based a correlation between the compression coefficient and an amount of moving image information compressed using the coefficient.

18. The apparatus of claim 1, wherein:
    the change in the predetermined state of the apparatus corresponds to an action taken by a user of the apparatus at the first temporal position; and
    the second temporal position identifies a portion of the moving picture information that includes an outcome of the user action.

19. A method, comprising:
    acquiring a plurality of successive images through image capturing;

storing, in a storage medium, the acquired images to generate moving image information;
detecting a change in spatial position of an image capturing apparatus during acquisition of the images;
in response to the detected change in the spatial position, identifying, using a processor, a first temporal position within the moving image information;
determining, within the moving image information, a second temporal position at which a magnitude of the change in spatial position exceeds a threshold value, the second temporal position corresponding to an effect of the detected change within the moving image information;
determining whether a difference between the first and second temporal positions exceeds a threshold time period; and
when difference exceeds the threshold time period, generating a signal to store information associated with the predetermined state at the second temporal position within the moving image information.

20. The method of claim 19, wherein the second temporal position occurs at a predetermined time after the first temporal position.

21. The method of claim 19, wherein the second temporal position occurs at a predetermined time before the first temporal position.

22. A tangible, non-transitory computer-readable medium storing instructions that, when executed by at least one processor, cause the at least one processor to perform a method comprising the steps of:

acquiring a plurality of successive images through image capturing;
storing, in a storage medium, the acquired images to generate moving image information;
detecting a change in a spatial position of an image capturing apparatus during acquisition of the images;
identifying, in response to the detected change in the spatial position, a first temporal position within the moving image information;
determining, within the moving image information, a second temporal position at which a magnitude of the change in spatial position exceeds a threshold value, the second temporal position corresponding to an effect of the detected change within the moving image information;
determining whether a difference between the first and second temporal positions exceeds a threshold time period; and
when difference exceeds the threshold time period, generating a signal to store information associated with the predetermined state at the second temporal position within the moving image information.

23. The computer-readable medium of claim 22, wherein the second temporal position occurs at a predetermined time after the first temporal position.

24. The computer-readable medium of claim 22, wherein the second temporal position occurs at a predetermined time before the first temporal position.

* * * * *